(12) United States Patent
Fukuda et al.

(10) Patent No.: US 11,353,047 B2
(45) Date of Patent: Jun. 7, 2022

(54) HYDRAULIC SYSTEM FOR WORK MACHINE AND WORK MACHINE

(71) Applicant: KUBOTA CORPORATION, Osaka (JP)

(72) Inventors: Yuji Fukuda, Osaka (JP); Kazuyoshi Arii, Osaka (JP); Hiroaki Nakagawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/848,513

(22) Filed: Apr. 14, 2020

(65) Prior Publication Data

US 2020/0240440 A1 Jul. 30, 2020

Related U.S. Application Data

(63) Continuation of application No. 15/634,219, filed on Jun. 27, 2017, now Pat. No. 10,648,489, which is a
(Continued)

(30) Foreign Application Priority Data

Apr. 7, 2015 (JP) ................................. 2015-078504

(51) Int. Cl.
*F15B 21/0423* (2019.01)
*F15B 13/042* (2006.01)

(52) U.S. Cl.
CPC ...... *F15B 21/0423* (2019.01); *F15B 13/0426* (2013.01); *F15B 2211/41518* (2013.01)

(58) Field of Classification Search
CPC ........ F15B 13/0426; F15B 2211/41518; F15B 21/0423
See application file for complete search history.

(56) References Cited

U.S. PATENT DOCUMENTS 5,235,809 A 8/1993 Farrell
6,244,048 B1 6/2001 Tanaka et al.
(Continued)

FOREIGN PATENT DOCUMENTS

JP 05-125747 5/1993
JP 2001-355613 12/2001
(Continued)

OTHER PUBLICATIONS

International Search Report in International Patent Application No. PCT/JP2015/086509, dated Apr. 5, 2016.

*Primary Examiner* — F Daniel Lopez
(74) *Attorney, Agent, or Firm* — Greenblum & Bernstein, P.L.C.

(57) ABSTRACT

A hydraulic system for a work machine includes a tank to store an operation fluid, a hydraulic device to be operated by the operation fluid, a control valve to control the hydraulic device, a first fluid tube connecting the hydraulic device and the control valve, the first fluid tube being to supply the operation fluid from the control valve to the hydraulic device, a second fluid tube branching from the first fluid tube and connected to the tank, a switch valve provided to the second fluid tube, the switch valve being to control a flow rate of the operation fluid, and an oil cooler provided to the second fluid tube between the switch valve and the tank.

5 Claims, 15 Drawing Sheets

Related U.S. Application Data continuation of application No. PCT/JP2015/086509, filed on Dec. 28, 2015.

(56) References Cited

U.S. PATENT DOCUMENTS

| | | | |
|---|---|---|---|
| 7,478,531 B2 * | 1/2009 | Ikeda | E02F 9/123 60/421 |
| 2004/0011192 A1 | 1/2004 | Frediani et al. | |
| 2013/0036729 A1 | 2/2013 | Kinugawa et al. | |

FOREIGN PATENT DOCUMENTS

| JP | 2003-120616 | 4/2003 |
|---|---|---|
| JP | 2013-036274 | 2/2013 |
| JP | 2014-062371 | 4/2014 |

* cited by examiner

HYDRAULIC SYSTEM FOR WORK MACHINE AND WORK MACHINE

CROSS-REFERENCE TO RELATED APPLICATIONS

The present application is a continuation application of U.S. application Ser. No. 15/634,219, filed Jun. 27, 2017, which is a continuation of International Application No. PCT/JP2015/086509, filed Dec. 28, 2015, and claims priority to Japanese Patent Application No. 2015/078504, filed Apr. 7, 2015. The contents of these applications are incorporated herein by reference in their entirety.

BACKGROUND OF THE INVENTION

Field of the Invention

The present invention relates to a hydraulic system for a work machine and the work machine having the hydraulic system.

Description of Related Art

Japanese Unexamined Patent Application Publication No. 2013-36274 discloses a work machine such as a skid steer loader and a compact track loader to which an auxiliary attachment is attached.

The work machine disclosed in Japanese Unexamined Patent Application Publication No. 2013-36274 includes a control valve configured to control a hydraulic actuator of the auxiliary attachment. A joint is connected to the control valve through a fluid tube. A hydraulic hose of the hydraulic actuator is capable of being connected to the joint. In this manner, the control valve is operated, and thereby the hydraulic actuator is operated.

BRIEF SUMMARY OF THE INVENTION

A hydraulic system for a work machine includes a tank to store an operation fluid, a hydraulic device to be operated by the operation fluid, a control valve to control the hydraulic device, a first fluid tube connecting the hydraulic device and the control valve, the first fluid tube being to supply the operation fluid from the control valve to the hydraulic device, a second fluid tube branching from the first fluid tube and connected to the tank, a switch valve provided to the second fluid tube, the switch valve being to control a flow rate of the operation fluid, and an oil cooler provided to the second fluid tube between the switch valve and the tank.

A hydraulic system for a work machine includes a hydraulic device to be operated by an operation fluid, a control valve to control the hydraulic device, a first fluid tube connecting the hydraulic device and the control valve, the first fluid tube being to supply the operation fluid from the control valve to the hydraulic device, a second fluid tube connected to the first fluid tube, the second fluid tube being capable of draining the operation fluid of the first fluid tube, a first operation valve provided to the second fluid tube and configured to change an aperture of the first operation valve, including a pressure-receiving portion to receive a pressure of a pilot fluid that is a part of the operation fluid used for control, a seventh fluid tube connected to the pressure-receiving portion of the first operation valve, a second operation valve provided to the seventh fluid tube and configured to change an aperture of the second operation valve, the second operation valve being to change the pressure of the pilot fluid to be applied to the pressure-receiving portion of the first operation valve in accordance with the aperture.

A hydraulic system for a work machine includes a working hydraulic pump to output an operation fluid, an extending hydraulic pump to output the operation fluid, a hydraulic device to be operated by the operation fluid, a control valve to control the hydraulic device, a first fluid tube connecting the hydraulic device and the control valve, the first fluid tube being to supply the operation fluid from the control valve to the hydraulic device, a second fluid tube connected to the first fluid tube, the second fluid tube being capable of draining the operation fluid of the first fluid tube, an eighth fluid tube branching the first fluid tube and connected to the extending hydraulic pump, a first operation valve including a pressure-receiving portion to receive a pressure of a pilot fluid that is a part of the operation fluid used for control, the first operation valve being provided to the second fluid tube and configured to change an aperture of the first operation valve in accordance with the pressure of the pilot fluid applied to the pressure-receiving portion, a third operation valve including a pressure-receiving portion to receive the pressure of the pilot fluid, the third operation valve being provided to the eighth fluid tube and configured to change an aperture of the third operation valve, a seventh fluid tube connected to the pressure-receiving portion of the first operation valve, and a ninth fluid tube connected to the pressure-receiving portion of the third operation valve and to the seventh fluid tube.

A work machine includes any one of the hydraulic systems mentioned above, a machine body, a working device disposed on the machine body, a connection member disposed on the working device and on an intermediate portion of the first fluid tube included in the hydraulic system, wherein a branching portion where the second fluid tube of the hydraulic system branches from the first fluid tube is disposed between the connection member and the control valve.

A work machine includes the hydraulic system mentioned above, a machine body, a working device disposed on the machine body, a connection member disposed on the working device and on an intermediate portion of the first fluid tube included in the hydraulic system, wherein a branching portion where the eighth fluid tube of the hydraulic system branches from the first fluid tube is disposed between the connection member and the control valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
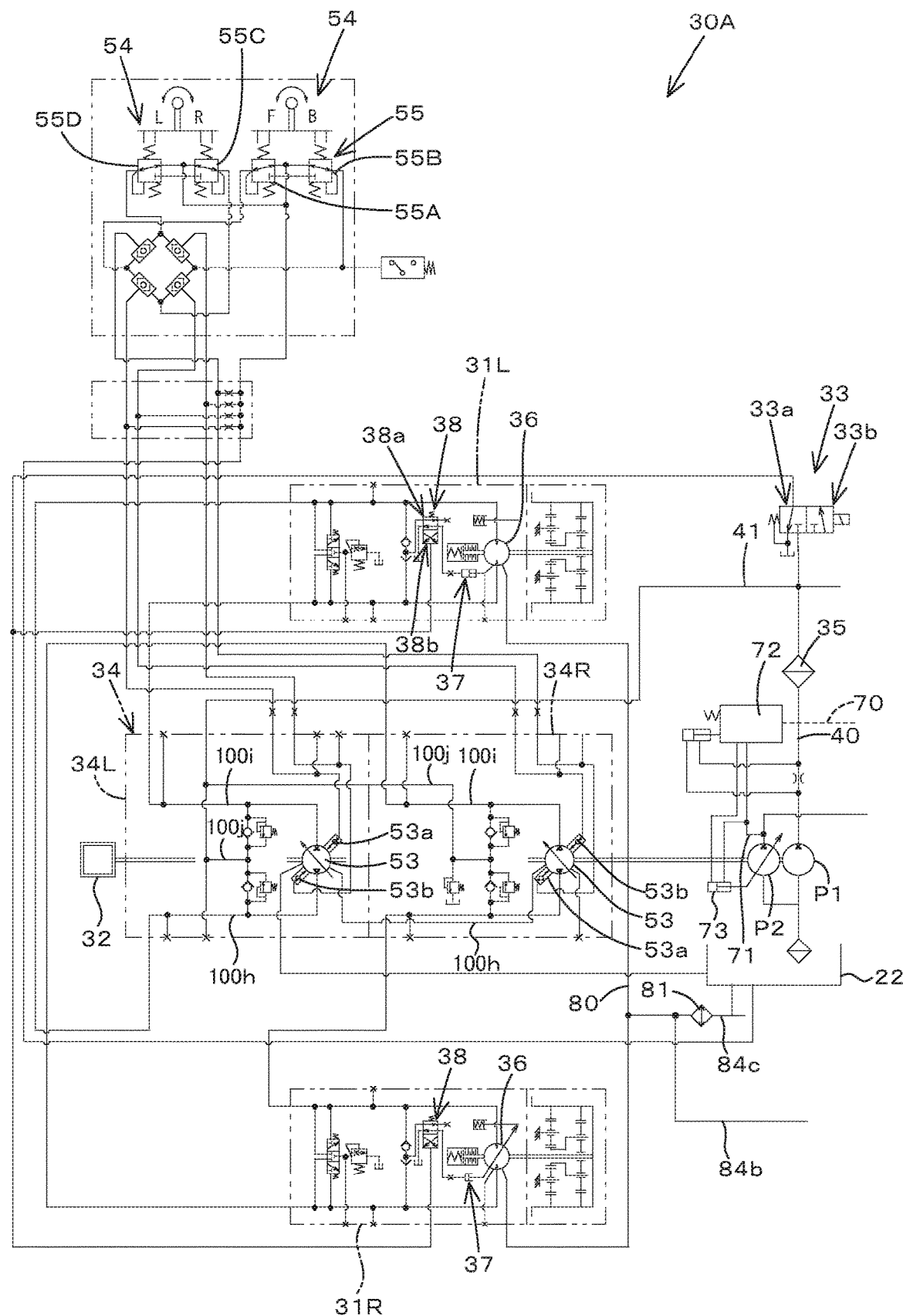
FIG. 1 is a schematic view illustrating a traveling hydraulic system according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Embodiments of the present invention, a hydraulic system for a work machine and the work machine having the hydraulic system, will be explained below referring to the drawings.

First Embodiment

Figure 11:
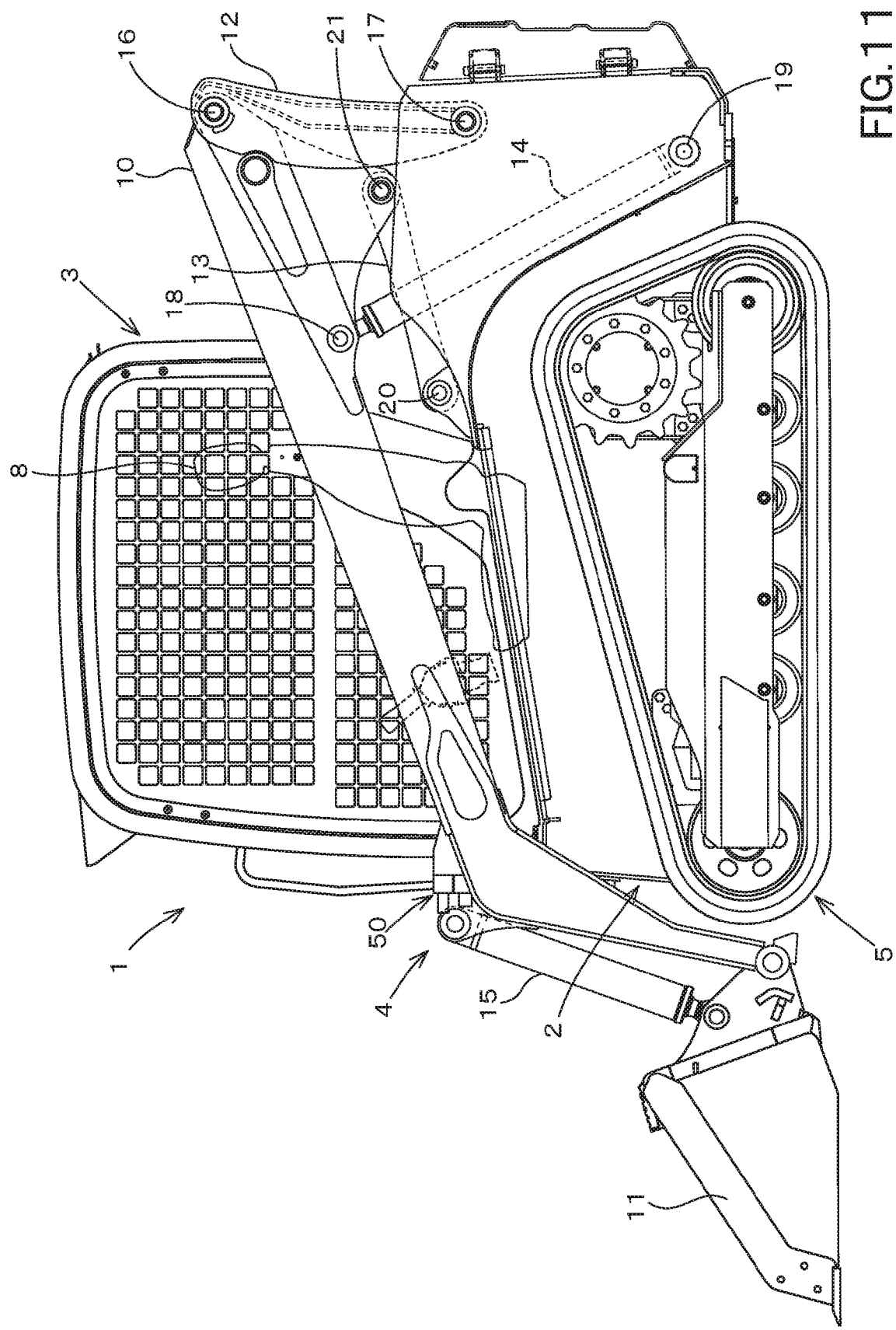
FIG. 11 is a side view illustrating a track loader that is an example of a work machine according to the embodiments of the present invention.
Figure 12:
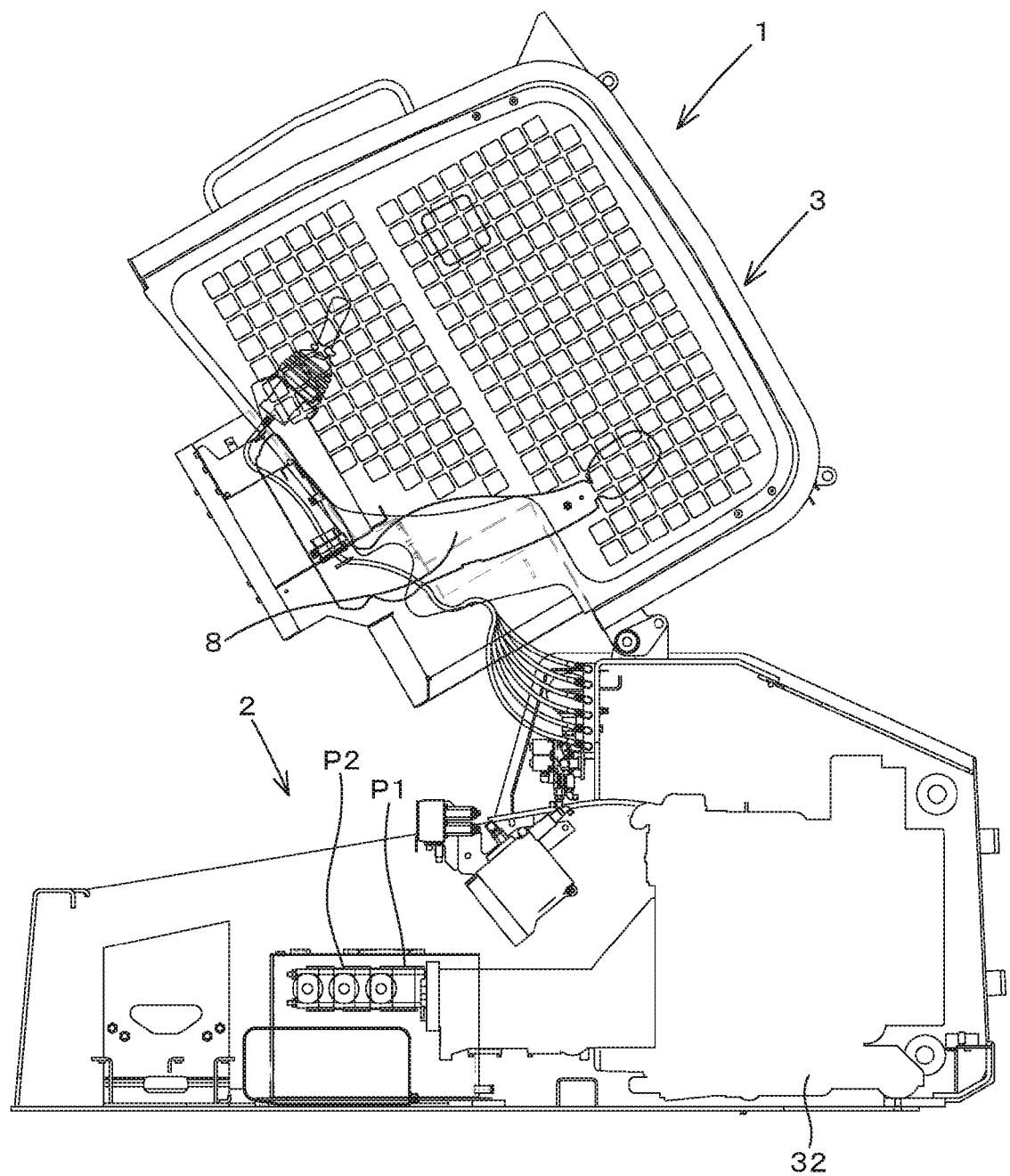
FIG. 12 is a side view illustrating a part of the track loader lifting up a cabin according to the embodiments.

A general configuration of a work machine according to a first embodiment of the present invention will be explained first. As shown in FIG. 11 and FIG. 12, the work machine 1 includes a machine body 2, a cabin 3, a work device 4, and a travel device 5.

FIG. 11 and FIG. 12 illustrate a compact track loader as an example of the work machine 1. However, the work machine 1 according to the embodiment is not limited to a compact track loader, and may be a tractor, a skid steer loader, a backhoe, for example.

Hereinafter, in explanations of all the embodiments of the present invention, a forward direction (a direction toward a left side in FIG. 11) corresponds to a front side of an operator seated on an operator seat of the work machine 1, a backward direction (a direction toward a right side in FIG. 11) corresponds to a back side of the operator, a leftward direction (a direction from the back toward a front side of FIG. 11) corresponds to a left side of the operator, and a rightward direction (a direction from the front toward a back side of FIG. 11) corresponds to a right side of the operator.

The cabin 3 is mounted on the machine body 2. An operator seat 8 is disposed inside the cabin 3. The work device 4 is attached to the machine body 2. The travel device is arranged outside the machine body 2. A prime mover is mounted on a rear portion inside the machine body 2.

The work device 4 includes a boom 10, a work tool 11, a lift link 12, a control link 13, a boom cylinder 14, and a bucket cylinder 15.

The boom 10 is arranged to the right of the cabin 3, and is capable of being swung upward and downward. Another boom 10 is arranged to the left of the cabin 3, and is capable of being swung upward and downward. The work tool 11 is constituted of a bucket, for example. The bucket 11 is arranged on a tip end portion (a front end portion) of the boom 10, and is capable of being swung upward and downward.

The lift link 12 and the control link 13 support a base portion (a rear portion) of the boom 10 such that the boom 10 is capable of being swung upward and downward. The boom cylinder 14 is stretched and shortened to move the boom 10 upward and downward. The bucket cylinder 15 is stretched and shortened to swing the bucket 11.

A front portion of the boom 10 arranged to the left is connected by a deformed connection pipe to a front portion of the boom 10 arranged to the right. A base portion (a rear portion) of the boom 10 arranged to the left is connected by a cylindrical connection pipe to a base portion (a rear portion) of the boom 10 arranged to the right.

The lift links 12, the control links 13, and the boom cylinders 14 are arranged to the left of the machine body 2 and to the right of the machine body 2, corresponding to the boom 10 disposed on the left and the boom 10 disposed on the right.

The lift links 12 are disposed on the rear portions of the base portions of the booms 10, and extend in a vertical direction. The upper portions (one end sides) of the lift links 12 are pivotally supported by pivotal supports shafts 16 (first pivotal support shafts), being closer to the rear portions of the base portions of the booms 10, and are capable of turning about the lateral axis.

In addition, the lower portions (the other end sides) of the lift links 12 are pivotally supported by pivotal supports shafts 17 (second pivotal support shafts), being closer to the rear portion of the machine body 2, and are capable of turning about the lateral axis. The second pivotal support shafts 17 are arranged below the first pivotal support shafts 16.

The upper portions of the boom cylinders 14 are pivotally supported by the pivotal support shafts 18 (third pivotal support shafts), and are capable of turning about the lateral axis. The third pivotal support shafts 18 are disposed on the base portions of the booms 10, specifically on the front portions of the base portions.

The lower portions of the boom cylinder 14 are pivotally supported by the pivotal support shafts 19 (fourth pivotal support shafts), and are capable of turning about the lateral axis. The fourth pivotal support shafts 19 are disposed below the third pivotal support shafts 18, being closer to the lower portion of the rear portion of the machine body 2.

The control links 13 are arranged in front of the lift links 12. One ends of the control links 13 are pivotally supported by the pivotal supports shafts 20 (fifth pivotal supports shafts), and are capable of turning about the lateral axis. The fifth pivotal support shafts 20 are disposed on the machine body 2, specifically on corresponding positions in front of the lift links 12. The other ends of the control links 12 are pivotally supported by the pivotal supports shafts 21 (sixth pivotal supports shafts), and are capable of turning about the lateral axis. The sixth pivotal support shafts 21 are disposed on the booms 10 in front of the second pivotal support shafts 17 and above the second pivotal support shafts 17.

When the boom cylinders 14 are stretched and shortened, the booms 10 swing upward and downward about the first pivotal support shafts 6 with the base portions of the booms 10 supported by the lift links 12 and the control links 13, and thus the tip end portions of the booms 10 move upward and downward.

The control links 13 swing upward and downward about the fifth pivotal support shafts 20 in accordance with the upward swinging and the downward swinging of the booms 10. The lift links 12 swing forward and backward about the second pivotal support shafts 17 in accordance with the upward swinging and the downward swinging of the control links 13.

The front portions of the booms 10 are capable of attaching other work tools instead of the bucket 11. The following attachments (auxiliary attachments) are exemplified as the other work tools; for example, a hydraulic crusher, a hydraulic breaker, an angle broom, an earth auger, a pallet fork, a sweeper, a mower, a snow blower and the like.

A connection member 50 is disposed on the front portion of the boom 10 disposed on the left. The connection member 50 is a device for connecting a hydraulic device of an auxiliary attachment disposed on a first tube member pipe such as a pipe disposed on the boom 10.

Specifically, the first tube member is capable of being connected to one end of the connection member 50, and a second tube member is capable of being connected to the other end of the connection member 50, the second tube member being connected to the hydraulic device of the auxiliary attachment. In this manner, an operation fluid flowing in the first tube member is supplied to the hydraulic device through the second tube member.

The bucket cylinders 15 are arranged on portions close to the front portions of the booms 10. The bucket cylinders 15 are stretched and shortened to swing the bucket 11.

Each of the travel device 5 disposed on the left and the travel device 5 disposed on the right employs a travel device of a crawler type (including a semi-crawler type) in the embodiment. Each of the travel devices 5 may employ a travel device of a wheel type having the front wheels and the rear wheels.

The hydraulic system for the work machine according to the embodiment will be explained below.

Figure 2:
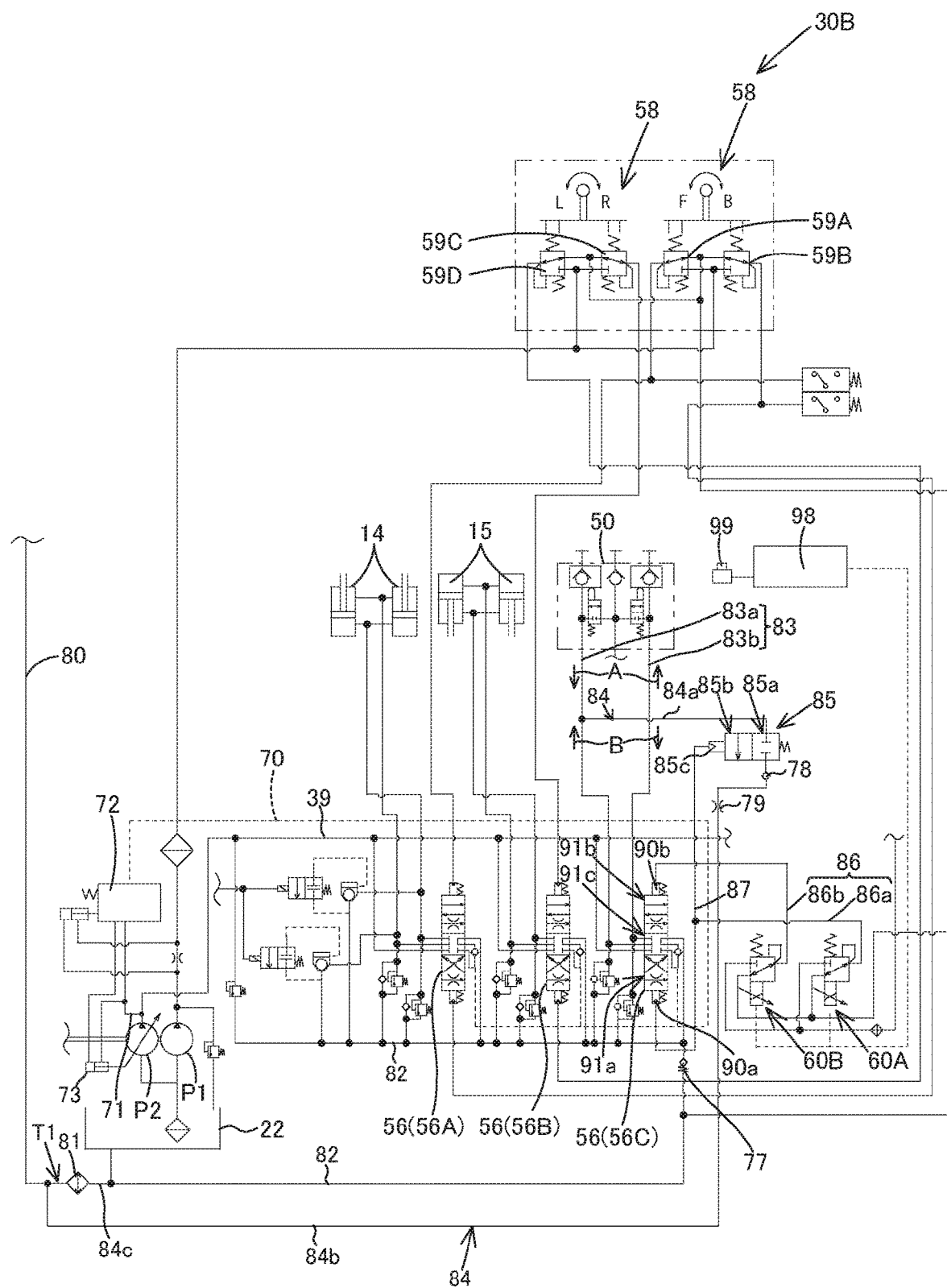
FIG. 2 is a schematic view illustrating a working hydraulic system according to the first embodiment.

As shown in FIG. 1 and FIG. 2, the hydraulic system is roughly separated into a hydraulic system for travel (a travel hydraulic system) 30A and a hydraulic system for work (a work hydraulic system) 30B.

The travel hydraulic system 30A will be explained below.

As shown in FIG. 1, the travel hydraulic system 30A is a system for driving the travel device 5. The travel device 5 mainly includes a left travel motor device 31L (a first travel motor device) and a right travel motor device 31R (a second travel motor device). The travel hydraulic system 30A includes a prime mover 32, a direction switch valve 33, a travel hydraulic pump (a first hydraulic pump) P1, a first travel motor 31L, a second travel motor 31R, and a hydraulic drive device 34.

The prime mover 32 is constituted of an electric motor, an engine, or the like. In the embodiment, the prime mover 32 is the engine. The first hydraulic pump P1 is a pump configured to be driven by a driving force of the prime mover 32. The first hydraulic pump P1 is constituted of a constant displacement gear pump.

The first hydraulic pump P1 is configured to output the operation fluid stored in the tank 22. In particular, the first hydraulic pump P1 outputs the operation fluid mainly used for the control. For convenience of the explanation, the tank 22 for storing the operation fluid may be referred to as an operation fluid tank. In addition, of the operation fluid outputted from the first hydraulic pump P1, the operation fluid used for the control is referred to as a pilot fluid, and a pressure of the pilot fluid is referred to as a pilot pressure.

An output fluid tube (an output fluid path) 40 is disposed on an output side of the first hydraulic pump P1, the output fluid tube 40 being configured to supply the operation fluid (the pilot fluid). The output fluid tube (a first fluid tube) 40 is provided with a filter 35, the direction switch valve 33, the first travel motor device 31L, and the second travel motor device 31R.

A first charge fluid tube 41 is arranged between the filter 35 and the direction switch valve 33, the first charge fluid tube 41 being branched from the output fluid tube 40. The first charge fluid tube 41 reaches the hydraulic drive device 34.

The direction switch valve 33 is an electromagnetic valve configured to change revolutions of the first travel motor device 31L and the second travel motor device 31R. The direction switch valve 33 is constituted of a two-position switch valve being switched to a first position 33a and to a second position 33b by magnetization. The direction switch valve 33 is switched by an operation member such as a switch not shown in the drawings.

The first travel motor device 31L is a motor configured to transmit a motive power to a drive shaft of the travel device 5, the travel device 5 being arranged to the left of the machine body 2. The second travel motor device 31R is a motor configured to transmit a motive power to a drive shaft of the travel device 5, the travel device 5 being arranged to the right of the machine body 2.

The first travel motor device 31L includes an HST motor (a travel motor) 36, a swash-plate switch cylinder 37, and a travel control valve (a hydraulic switch valve) 38. The HST motor 36 is a variable displacement axial motor having a swash plate, and is a motor capable of changing a vehicle speed (revolution) to a first speed and to a second speed. In other words, the HST motor 36 is a motor capable of changing a thrust power of the work machine 1.

A sixth fluid tube (a sixth fluid path) 80 is disposed on the HST motor 36. The sixth fluid tube 80 is a fluid tube for supplying the operation fluid leaking from the HST motor 36 for example, and extends toward the operation fluid tank 22.

One end of the sixth fluid tube 80 is connected to a drain port of the HST motor 36. The other end of the sixth fluid tube 80 is connected to an oil cooler (a fluid cooler) 81 configured to cool the operation fluid. In this manner, the operation fluid heated up by the revolution of the HST motor 36 reaches the oil cooler 81, passing through the sixth fluid tube 80, and thus the oil cooler 81 can cool the operation fluid.

Then, the operation fluid cooled by the oil cooler 81 returns to the operation fluid tank 22.

The swash-plate switch cylinder 37 is a cylinder configured to be stretched and shortened to change an angle of the swash plate of the HST motor 36. The travel control valve 38 is a valve for stretching and shortening the swash-plate switch cylinder 37 to one side and to the other side, that is, the travel control valve 38 is constituted of a two-position switch valve configured to be switched to a first position 38a and to a second position 38b. The travel control valve 38 is switched by the direction switch valve 33 that is connected to the travel control valve 38 and arranged on an upper stream of the travel control valve 38.

As described above, when the switch (the operation member) is operated to switch the direction switch valve 33 to the first position 33a, the first travel motor 31L releases the pilot fluid in a section between the direction switch valve 33 and the travel control valve 38, and thus the travel control valve 38 is switched to the first position 38a. As the result, the swash-plate switch cylinder 37 is shortened, and thus the HST motor 36 is set to the first speed.

In addition, when the switch (the operation member) is operated to switch the direction switch valve 33 to the second position 33b, the pilot fluid is supplied to the travel control valve 38 through the direction switch valve 33, and thus the travel control valve 38 is switched to the second position 38b. As the result, the swash-plate switch cylinder 37 is stretched, and thus the HST motor 36 is set to the second speed.

Meanwhile, the second travel motor device 31R is operated in the manner similar to the manner of the first travel motor device 31l. The configurations and movements of the second travel motor device 31R is similar to the configurations and movements of the first travel motor device 31L. Thus, the explanation of the second travel motor device 31R will be omitted.

The hydraulic device 34 is a device configured to drive the first travel motor device 31L and the second travel motor device 31R. The hydraulic device 34 includes a drive circuit (a left drive circuit) 34L and a drive circuit (a right drive circuit) 34R. The drive circuit 34L is configured to drive the first travel motor device 31L. The drive circuit 34R is configured to drive the second travel motor device 31R.

The drive circuit 34L includes an HST pump (a travel pump) 53, a speed-changing fluid tube (a speed-changing fluid path) 100h, a speed-changing fluid tube (a speed-changing fluid path) 100i, and a second charging fluid tube (a second charging fluid path) 100j. The drive circuit 34R includes another HST pump (a travel pump) 53, the speed-changing fluid tube 100h, the speed-changing fluid tube 100i, and the second charging fluid tube 100j. The speed-changing fluid tubes 100h and 100i are fluid tubes (fluid paths) connecting the HST pumps 53 to the HST motor 36.

The second charging fluid tube 100j is a fluid tube (a fluid path) connected to the speed-changing fluid tubes 100h and 100i, and is configured to charge the operation fluid from the first hydraulic pump P1 to the speed-changing fluid tubes 100h and 100i.

Each of the HST pumps 53 is the variable displacement axial pump having a swash plate. The variable displacement axial pump is configured to be driven by a motive power of the prime mover 32. Each of the HST pumps 53 includes a forward-movement pressure-receiving portion 53a (a pressure-receiving portion 53a) and a backward-movement pressure-receiving portion 53b (a pressure-receiving portion 53b). The pilot pressure is applied to the forward-movement pressure-receiving portion 53a and the backward-movement pressure-receiving portion 53b. An angle of the swash plate is changed by the pilot pressure applied to the pressure-receiving portion 53a and the pressure-receiving portion 53b.

When the angle of the swash plate is changed, the changing changes the outputs (output amounts of the operation fluid) of the HST pumps 53 and changes the directions of the outputs of the operation fluid.

A travel lever 54 changes the outputs of the HST pumps 53 and the directions of the outputs of the operation fluid. The travel lever 54 is arranged around the operator seat 8. The travel lever 54 is swingably supported to be capable of being tilted from an neutral position toward a forward, a backward, a leftward, and a rightward directions and the diagonal directions each between the forward, the backward, the leftward, and the rightward directions.

When the travel lever 54 is operated to be tilted, the pilot valves 55 arranged under the travel lever 54 are operated the travel lever 54.

When the operation lever 54 is tilted forward (in one direction) in the forward and backward directions (the first direction), that is, the operation lever 54 is operated in a forward operation, a forward-movement operation valve 55A of the operation valves 55 is operated to output the pilot pressure. The pilot pressure is applied to the forward-movement pressure-receiving portion 53a of the left drive circuit 34L and to the forward-movement pressure-receiving portion 53a of the right drive circuit 34R.

In this manner, an output shaft of the HST motor 36 revolves normally (revolves forward) at a speed proportional to a tilting amount (a tilting extent) of the travel lever 54, and thereby the work machine 1 travels forward and straight.

When the operation lever 54 is tilted backward (in the other direction) in the forward and backward directions (the first direction), that is, the operation lever 54 is operated in a backward operation, a backward-movement operation valve 55A of the operation valves 55 is operated to output the pilot pressure. The pilot pressure is applied to the backward-movement pressure-receiving portion 53b of the left drive circuit 34L and to the backward-movement pressure-receiving portion 53b of the right drive circuit 34R.

In this manner, the output shaft of the HST motor 36 revolves reversely (revolves backward) at a speed proportional to a tilting amount (a tilting extent) of the travel lever 54, and thereby the work machine 1 travels backward and straight.

When the operation lever 54 is tilted rightward (in one direction) in the lateral direction (the second direction), that is, the operation lever 54 is operated in a rightward operation, a rightward-movement operation valve 55C of the operation valves 55 is operated to output the pilot pressure. The pilot pressure is applied to the forward-movement pressure-receiving portion 53a of the left drive circuit 34L and to the backward-movement pressure-receiving portion 53b of the right drive circuit 34R.

In this manner, the output shaft of the HST motor 36 arranged to the left revolves normally (revolves forward), the output shaft of the HST motor 36 arranged to the right revolves reversely (revolves backward), and thereby the work machine 1 turns rightward.

When the operation lever 54 is tilted leftward (in the other direction) in the lateral direction (the second direction), that is, the operation lever 54 is operated in a leftward operation, a leftward-movement operation valve 55D of the operation valves 55 is operated to output the pilot pressure. The pilot pressure is applied to the forward-movement pressure-receiving portion 53a of the right drive circuit 34R and to the backward-movement pressure-receiving portion 53b of the left drive circuit 34L.

In this manner, the output shaft of the HST motor 36 arranged to the right revolves normally (revolves forward), the output shaft of the HST motor 36 arranged to the left revolves reversely (revolves backward), and thereby the work machine 1 turns leftward.

In addition, when the operation lever 54 is tilted in the diagonal direction, turning directions and turning speeds of the output shafts of the travel motor 36 arranged to the left side and the travel motor 36 arranged to the right side are determined by a differential pressure between the pilot pressure applied to the pressure-receiving portion 53a and the pilot pressure applied to the pressure-receiving portion 53b, and thus the work machine 1 turns rightward or leftward traveling forward or backward.

The work hydraulic system 30B will be explained below.

As shown in FIG. 2, the work hydraulic system 30B is a system configured to operate the booms 10, the bucket 11, an auxiliary attachment, and the like. The work hydraulic system 30B includes a plurality of control valves 56 and a work operation hydraulic pump (a second hydraulic pump) P2.

The second hydraulic pump P2 is a pump configured to be driven by a motive power of the prime mover 32 and arranged on a position different from the position of the first hydraulic pump P1. The second hydraulic pump P2 is constituted of a various displacement axial pump having a swash plate.

The second hydraulic pump P2 is configured to output the operation fluid stored in the operation fluid tank 22. In particular, the second hydraulic pump P2 outputs the operation fluid mainly used for operating the hydraulic actuators.

A fluid tube (a fluid path) 39 is disposed on an output side of the second hydraulic pump P2. The plurality of control valves 56 are connected to the fluid tube 39. As shown in FIG. 2, the plurality of control valves 56 include a first control valve 56A, a second control valve 56B, and a third control valve 56C.

The first control valve 56A is a valve configured to control the hydraulic cylinder (the boom cylinder) 14 for controlling the boom. The second control valve 56B is a valve configured to control the hydraulic cylinder (the bucket cylinder) 15 for controlling the bucket.

Operations of the boom 10 and the bucket 11 will be explained first.

Each of the boom control valve 56A and the bucket control valve 56B is constituted of a three-position switch valve having a direct-acting spool that is configured to be driven by the pilot pressure. Each of the boom control valve 56A and the bucket control valve 56B is switched by the pilot pressure to a neutral position, to a first position different from the neural position, and to a second position different from the neutral position and the first position.

The boom cylinder 14 is connected to the boom control valve 56A by a fluid tube. The bucket cylinder 15 is connected to the second control valve 56B by a fluid tube.

The boom 10 and the bucket 11 are operated by an operation lever 58 arranged around the operator seat 8. The operation lever 58 is swingably supported to be capable of being tilted from an neutral position toward a forward and a backward directions, a leftward and a rightward directions, and the diagonal directions. When the operation lever 58 is tilted, and thereby the pilot valves arranged under the operation lever 58 are operated.

When the operation lever 58 is tilted forward (a forward operation is performed), a downward-movement pilot valve 59A is operated to output the pilot pressure. The pilot pressure is applied to the pressure-receiving portion of the boom control valve 56A. In this manner, the boom 10 moves downward.

When the operation lever 58 is tilted backward (a backward operation is performed), an upward-movement pilot valve 59B is operated to output the pilot pressure. The pilot pressure is applied to the pressure-receiving portion of the boom control valve 56A. In this manner, the boom 10 moves upward.

When the operation lever 58 is tilted rightward (a rightward operation is performed), an bucket-dumping pilot valve 59C is operated, and thus the pilot fluid is applied to the pressure-receiving portion of the bucket control valve 56B. As the result, the bucket control valve 56B is actuated to stretch the bucket cylinder 15, and thus the bucket 11 performs a dumping movement at a speed proportional to the tilting amount (the tilting extent) of the operation lever 58.

When the operation lever 58 is tilted leftward (a leftward operation is performed), an bucket-shoveling pilot valve 59D is operated, and thus the pilot fluid is applied to the pressure-receiving portion of the bucket control valve 56B. As the result, the bucket control valve 56B is actuated to shorten the bucket cylinder 15, and thus the bucket 11 performs a shoveling movement at a speed proportional to the tilting amount (the tilting extent) of the operation lever 58.

A fifth fluid tube (a fifth fluid path) 82 is connected to the drain sides (the drain ports) of the boom control valve 56A, the bucket control valve 56B, and the auxiliary control valve 56C, the drain side (the drain ports) being configured to drain the operation fluid. The fifth fluid tube 82 is a fluid tube (a fluid path) for supplying the operation fluid to the operation fluid tank 22, the operation fluid being drained from the control valves (the boom control valve 56A, the bucker control valve 56B, the auxiliary control valve 56C).

In this manner, the operation fluid returning from the boom cylinder 14 to the boom control valve 56A (a returning operation fluid), the operation fluid returning from the bucket cylinder 15 to the bucket control valve 56B (a returning operation fluid), and the operation fluid (the drain) returning from the hydraulic device to the auxiliary control valve 56C (a returning operation fluid) are supplied to the fifth fluid tube 82.

The fifth fluid tube 82 is connected indirectly to the second fluid tube (the third drain fluid tube 84c) through the oil cooler 81 as described later. The fifth fluid tube 82 is provided with a first check valve 77. The first check valve 77 allows the operation fluid having a predetermined pressure or more to flow from a side of the fifth fluid tube 82 toward the second fluid tube 84, and block the operation fluid flowing from the side of the second fluid tube 84 toward the control valves (the boom control valve 56A, the bucket control valve 56B, and the auxiliary control valve 56C).

A setup pressure of the first check valve 77 is set to be from 2 kgf/cm$^2$ to 5 kgf/cm$^2$. The control valve unit including the plurality of control valves is provided with the fifth fluid tube 82. However, the first check valve 77 may be arranged in the vicinity of a tank port (a port for draining the operation fluid) in the control valve unit, and may be arranged on an intermediate portion of a tube member connected to the tank port from the outside of the control valve unit.

The auxiliary control valve 56C and the fluid tubes arranged around the auxiliary control valve 56C will be explained in detail below.

The auxiliary control valve 56C is constituted of a three-position switch valve having a direct-acting spool that is configured to be driven by the pilot pressure. The auxiliary control valve 56C is switched by the pilot pressure to a first position 91a, a second position 91b, and a third position (a neutral position) 91c.

That is, the auxiliary control valve 56C is a valve configured to be switched to the first position 91a, to the second position 91b, and to the third position 91c and thereby to control a flow rate and a pressure of the operation fluid flowing toward the hydraulic device of the auxiliary attachment. That is, the auxiliary control valve 56C is a valve configured to control the hydraulic device.

The hydraulic device is a device for driving the auxiliary attachments such as the hydraulic crusher, the hydraulic breaker, the angle broom, the earth auger, the pallet fork, the sweeper, the mower, the snow blower, and is operated by the operation fluid. For example, the hydraulic device is constituted of a hydraulic cylinder, a hydraulic motor, or the like.

A first fluid tube (a first fluid path) 83 is connected to the auxiliary control valve 56C. One end of the first fluid tube 83 is connected to a supply-drain port of the auxiliary control valve 56C. An intermediate portion of the first fluid tube 83 is connected to the connection member 50. The other end of the first fluid tube 83 is connected to the hydraulic device of the auxiliary hydraulic actuator. The first fluid tube 83 is constituted of the first tube member and the second tube member described above.

In particular, the first fluid tube 83 includes a first supply-discharge (supply-drain) fluid tube 83a that connects a first supply-discharge (supply-drain) port of the auxiliary control valve 56C to a first port of the connection member 50. In addition, the first fluid tube 83 includes a second supply-discharge (supply-drain) fluid tube 83b that connects a second supply-discharge port of the third control valve 56C to a second port of the connection member 50.

That is, the operation of the auxiliary control valve 56C allows to supply the operation fluid from the auxiliary control valve 56C toward the first supply-drain fluid tube 83a and to supply the operation fluid from the auxiliary control valve 56C toward the second supply-discharge fluid tube 83b.

The auxiliary control valve 56C is operated by two electromagnetic valves, a first proportional valve 60A and a second proportional valve 60B. The auxiliary control valve 56C is connected to the electromagnetic valves (the first electromagnetic valve 60A and the second electromagnetic valve 60B) by a third fluid tube (a third fluid path) 86.

Meanwhile, the first hydraulic pump P1 supplies the pilot fluid to the first electromagnetic valve 60A and the second electromagnetic valve 60B, the pilot fluid being the operation fluid used for control that is a part of the operation fluid.

The third fluid tube 86 is a fluid tube for supplying the pilot fluid to the auxiliary control valve 56C through the electromagnetic valves 60 (the first electromagnetic valve 60A and the second electromagnetic valve 60B). The third fluid tube 86 includes a first control fluid tube (a first control fluid path) 86a and a second control fluid tube (a second control fluid path) 86b. The first control fluid tube 86a connects the first electromagnetic valve 60A to the pressure-receiving portion 90a of the auxiliary control valve 56C. The second control fluid tube 86b connects the second electromagnetic valve 60B to the pressure-receiving portion 90b of the auxiliary control valve 56C.

Each of the first electromagnetic valve 60A and the second electromagnetic valve 60B is a valve configured to be magnetized to change the aperture of each of the first electromagnetic valve 60A and the second electromagnetic valve 60B. The first electromagnetic valve 60A and the second electromagnetic valve 60B are magnetized by a control device (a controller) 98 constituted of a CPU or the like. In particular, an operation member 99 is connected to the controller 98.

An operation amount (an operation extent) of the operation member 99 (for example, a sliding amount, a swinging amount, or the like) is inputted to the control device 98. The operation member 99 is constituted of a seesaw switch configured to be swung, a slide switch configured to be slid, or a push switch configured to be pushed.

The controller 98 applies an electric current to the solenoid of the first electromagnetic valve 60A or to the solenoid of the second electromagnetic valve 60B, the electric current corresponding to the operation amount of the operation member 99. That is, the first electromagnetic valve 60A and the second electromagnetic valve 60B change the apertures corresponding to the operation amount of the operation member 99.

For example, the aperture of the first electromagnetic valve 60A is adjusted by swinging or sliding the operation member 99 in one direction. In that case, when the pressure of the pilot fluid (the pilot pressure) first control fluid tube 86a is equal to a predetermined value (the setup value) or more, the spool of the auxiliary control valve 56C moves to switch the auxiliary control valve 56C to the first position 91a.

In addition, the aperture of the second electromagnetic valve 60B is adjusted by swinging or sliding the operation member 99 in the other direction. In that case, when the pressure of the pilot fluid (the pilot pressure) in the second control fluid tube 86b is equal to a predetermined value (the setup value) or more, the spool of the auxiliary control valve 56C moves to switch the auxiliary control valve 56C to the second position 91b.

When the auxiliary control valve 56C is at the first position 91a, the operation fluid flows in the first supply-discharge fluid tube 83a and in the second supply-discharge fluid tube 83b (the first fluid tube 83) in a direction indicated by an arrowed line A as shown in FIG. 2. In addition, when the auxiliary control valve 56C is at the second position 91b, the operation fluid flows in the first supply-discharge fluid tube 83a and in the second supply-discharge fluid tube 83b (the first fluid tube 83) in a direction indicated by an arrowed line B.

In tins manner, when the operation member 99 is operated to switch the auxiliary control valve 56C to a predetermined position, the direction of flowing of the operation fluid can be changed in the first supply-discharge fluid tube 83a and in the second supply-discharge fluid tube 83b (the first fluid tube 83), and thereby controlling the movement of the hydraulic device connected to the first fluid tube 83.

The second fluid tube 84 is connected to the first supply-discharge fluid tube 83a, that is, to the first fluid tube 83. The second fluid tube 84 is a fluid tube branching from an intermediate portion of the first supply-discharge fluid tube 83a between the connection member 50 and the auxiliary control valve 56C and extending toward the operation fluid tank 22.

In particular, one end of the second fluid tube 84 is connected to the first supply-discharge fluid tube 83a, and the other end of the second fluid tube 84 is connected to the operation fluid tank 22. A switch valve 85 is disposed on an intermediate portion of the second fluid tube 84. In addition, the oil cooler 81 is arranged on the second fluid tube 84 between the switch valve 85 and the operation fluid tank 22.

To be detailed, the second fluid tube 84 includes a first drain fluid tube 84a, a second drain fluid tube 84b, and a third drain fluid tube 84c. The first drain fluid tube 84a connects the first supply-discharge fluid tube 83a to the switch valve 85. The second drain fluid tube 84b connects the switch valve 85 to the oil cooler 81. The third drain fluid tube 84c connects the oil cooler 81 to the operation fluid tank 22. Meanwhile, a part of the second drain fluid tube 84b is shared with a part of the sixth fluid tube 80.

In particular, a section T1 between the oil cooler 81 and a confluent portion 84e is a fluid tube shared with the second drain fluid tube 84b and the sixth fluid tube 80, the confluent portion 84e being a portion where an intermediate portion of the second drain fluid tube 84b and an intermediate portion of the sixth fluid tube 80 are confluent each other.

In this manner, at least a part of the operation fluid returning from the hydraulic device can be supplied to the oil cooler 81 and the operation fluid tank 22 through the second fluid tube 84 (the first drain fluid tube 84a, the second drain fluid tube 84b, and the third drain fluid tube 84c).

In other words, the second fluid tube 84 is capable of supplying the operation fluid to the oil cooler 81, bypassing the operation fluid returning from the hydraulic device.

The switch valve 85 is a valve configured to change the aperture, and is constituted of a two-position switch valve configured to be switched to the first position 85a and the second position 85b. When the switch valve 85 is at the first position 85a, the aperture is substantially zero, and thus the switch valve 85 blocks the connection between the first drain fluid tube 84a and the second drain fluid tube 84b.

When the switch valve 85 is at the second position 85b, the aperture is fully opened, and thus the switch valve 85 allows the communication between the first drain fluid tube 84a and the second drain fluid tube 84b.

The switch valve 85 is switched to the first position 85a and to the second position 85b by the pilot pressure applied to the auxiliary control valve 56C. In particular, a fourth fluid tube 87 is arranged between the first control fluid tube 86a and the pressure-receiving portion 85c to which the pilot pressure of the switch valve 85 is applied. The fourth fluid tube 87 connects the pressure-receiving portion 85c to the first control fluid tube 86a.

In this manner, the pilot pressure of the pilot fluid of the first control fluid tube 86a is applied to the pressure-receiving portion 85c through the fourth fluid tube 87.

Here, an aperture of the switch valve 85 is set based on a pressure of the pilot fluid applied to the fourth fluid tube 87 from the first control fluid tube 86a that is the third fluid tube 86. That is, the aperture of the switch valve 85 is set based on the operation amount inputted to the controller 98.

When the aperture of the first electromagnetic valve 60A is small and the pilot pressure of the pilot fluid of the first control fluid tube 86a is less than the setup value for example, the auxiliary control valve 56C is at the neutral position that is the third position 91c. In that case, the aperture of the switch valve 85 is less than the predetermined value, and is at the first position 85a.

That is, the switch valve 85 is also closed under that state where the auxiliary control valve 56C is at the third position 91c and the operation fluid is not supplied to the first control fluid tube 86a.

On the other hand, when the aperture of the first electromagnetic valve 60A is large and the pilot pressure of the pilot fluid of the first control fluid tube 86a is the setup value or more, that is, when a stroke of the spool of the auxiliary control valve 56C is a predetermined extent or more (two thirds or more), the auxiliary control valve 56C is switched to the first position 91a. In that case, the aperture of the switch valve 85 is a predetermined value or more, and thus the switch valve 85 is switched to the second position 85b.

In particular, the switch valve 85 is opened under the state where the auxiliary control valve 56C is switched to the first position 91a and the operation fluid flows in the first supply-discharge fluid tube 83a in the direction indicated by the arrowed line A.

That is, the switch valve 85 is opened under the state where the operation fluid of the hydraulic device has returned to the first supply-discharge fluid tube 83a (when the first supply-discharge fluid tube 83a serves as a fluid tube for supplying the returning fluid). In this manner, the operation fluid in the first control fluid tube 86a can be supplied to the oil cooler 81 through the second fluid tube 84.

Thus, the operation fluid returning from the hydraulic device can be easily cooled in synchronization with the movement of the auxiliary control valve 56C (an operation of the operation valve 99).

In particular, a temperature of the operation fluid may be increased in accordance with the revolving of the hydraulic motor in a case where the operation member 99 is operated in one direction and a hydraulic motor is continuously driven in one direction, the hydraulic motor being one of the hydraulic devices. In the embodiment, the operation fluid returning from the hydraulic devices is supplied to the oil cooler 81 through the second fluid tube 84, and thereby the temperature of the operation fluid can be prevented from increasing.

For example, in the case where the auxiliary attachment is the hydraulic breaker or the angle broom and the auxiliary attachment is continuously driven for a certain length of time by the hydraulic motor, the operation fluid of the first supply-discharge fluid tube 83a flows into the oil cooler 81 through the second fluid tube 84. In this manner, the hydraulic breaker and the angle broom can be driven with the operation fluid cooled by the oil cooler 81.

Meanwhile, as shown in FIG. 2, a second check valve 78 may be disposed on the second fluid tube 84 between the switch valve 85 and the operation fluid tank 22 in the work hydraulic system 30B. In particular, the second check valve 78 is arranged to the second drain fluid tube 84b. The second check valve 78 is a valve configured to block the operation fluid flowing from the oil cooler 81 toward the switch valve 85.

In this manner, the provision of the second check valve 78 supplies the operation fluid returning from the hydraulic device to the oil cooler 81 through the second fluid tube 84 even when various types of drain fluid tubes (for example, the sixth fluid tube 80 for supplying a drain fluid of the HST motor) other than the second fluid tube 84 are connected to the oil cooler 81.

In addition, the second fluid tube 84 may be provided with a first throttle portion 79. In particular, the first throttle portion 79 is arranged on a side closer to the oil cooler 81 than the second check valve 78 in the second drain fluid tube 84b of the second fluid tube 84. The first throttle portion 79 is capable of suppressing (reducing) a pressure of the operation fluid (the drain) flowing toward the oil cooler 81. Meanwhile, the first throttle portion 79 may be disposed on an intermediate portion of the first drain fluid tube 84a of the second fluid tube 84.

In addition, the first check valve 77 is disposed in the vicinity of a tank port of the control valve unit. In this manner, the second fluid tube 84 easily supplies the operation fluid to the oil cooler 81 and the operation fluid tank 22.

The hydraulic system 30B according to the first embodiment includes a load sensing system. The load sensing system is a system configured to control an output rate of the second hydraulic pump P2 in accordance with a work load. The load sensing system includes a first detection fluid tube 70, a second detection fluid tube 71, a flow rate compensation valve 72, and a swash plate control portion (a swash plate controller) 73.

The first detection fluid tube 70 (referred to as a PLS fluid tube) is a fluid tube connected to the control valves 56A, 56B, and 56C and configured to detect a load pressure generated when the control valves 56A, 56B, and 56C are activated.

In addition, the first detection fluid tube 70 is also connected to the flow rate compensation valve 72, and transmits "a PUS signal pressure" to the flow rate compensation valve 72, the PLS signal pressure being the highest one of the load pressures of the control valves 56A, 56B, and 56C. The second detection fluid tube 71 (referred to as a PPS fluid tube) connects the flow rate compensation valve 72 to an output side of the second hydraulic, pump P2, and transmits "a PPS signal pressure" to the flow rate compensation valve 72, the PPS signal pressure being an output pressure of the operation fluid outputted from the second hydraulic pump P2.

The swash plate control portion 73 is a device having a piston, a housing, and a rod. The piston is moved by the pressure of the operation fluid. The housing houses the piston. The rod is coupled to the piston. One end of the housing is connected to the flow rate compensation valve 72, and the other end of the housing is connected to the output side of the second hydraulic pump P2. The rod (a moving portion) of the swash plate control portion 73 is connected to the swash plate of the second hydraulic pump P2, and is stretched and shortened to change an angle of the swash plate.

The flow rate compensation valve 72 is a valve configured to control the swash plate control portion 73 on the basis of the PLS signal pressure and the PPS signal pressure. The flow rate compensation valve 72 applies a pressure to one end side of the swash plate control portion 73 such that a differential pressure (a first differential pressure) between the PPS signal pressure and the PLS signal pressure can be a predetermined pressure.

That is, the flow rate compensation valve 72 stretches and shortens the rod disposed on the other end side of the swash plate control portion 73 such that the differential pressure (the first differential pressure) between the PPS signal pressure and the PLS signal pressure can be constant.

As described above, the load sensing system changes the angle of the swash plate such that the first differential pressure can be constant, and thereby the output rate of the second hydraulic pump P2 is adjusted on the basis of the load pressure. Meanwhile, the hydraulic system according to the embodiment may be provided without the load sensing system.

Second Embodiment

Figure 3:
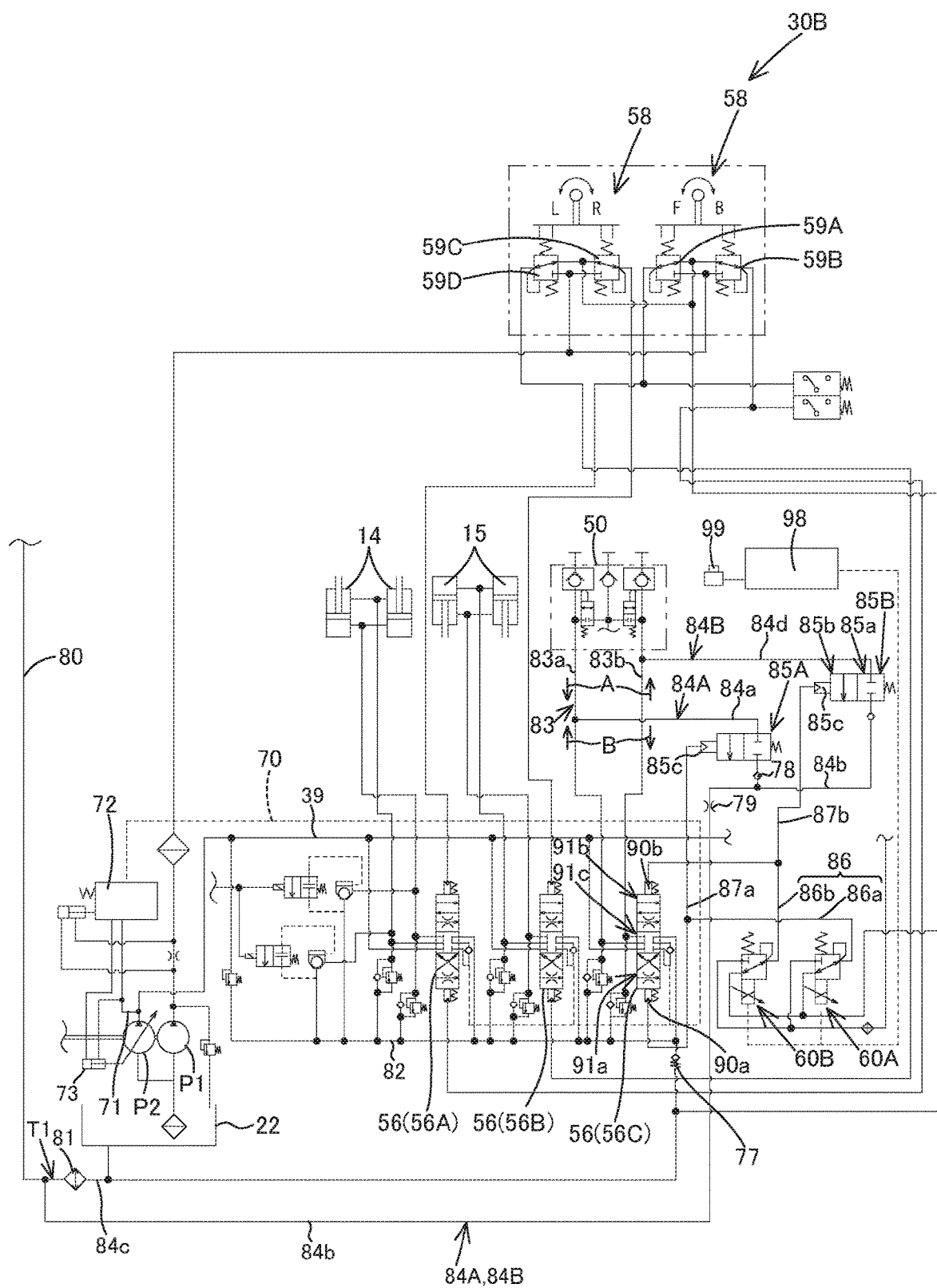
FIG. 3 is a schematic view illustrating a working hydraulic system according to a second embodiment of the present invention.

A modified example of the hydraulic system according to a second embodiment of the present invention will be explained below. FIG. 3 shows a view illustrating the hydraulic system having two second fluid tubes 84 and arranging the switch valves 85 to each of the second fluid tubes 84. Explanation of configurations similar to the configurations according to the first embodiment will be omitted.

The second fluid tube 84A is connected to the first supply-discharge fluid tube 83a, and the second fluid tube 84B is connected to the second supply-discharge fluid tube 83b. The switch valve 85A is disposed on an intermediate portion of the second fluid tube 84A, and the switch valve 85B is disposed on an intermediate portion of the second fluid tube 84B.

The second fluid tube 84A includes a first drain fluid tube 84a, a second drain fluid tube 84b, and a third drain fluid tube 84c. The first drain fluid tube 84a connects the first supply-discharge fluid tube 83a to the switch valve 85A. The second drain fluid tube 84b connects the switch valve 85A to the oil cooler 81. The third drain fluid tube 84c connects the oil cooler 81 to the operation fluid tank 22.

The second fluid tube 84B includes a fourth drain fluid tube 84d, the second drain fluid tube 84b, and the third drain fluid tube 84c. The fourth drain fluid tube 84d connects the second supply-discharge fluid tube 83b to the switch valve 85A. The second drain fluid tube 84b connects the switch valve 85B to the oil cooler 81. The third drain fluid tube 84c connects the oil cooler 81 to the operation fluid tank 22. The second drain fluid tube 84b and the third drain fluid tube 84c are shared with the second fluid tube 84A and the second fluid tube 84B.

In the embodiment, the hydraulic system includes two fluid tubes, a fourth fluid tube 87a and a fourth fluid tube 87b. The fourth fluid tube 87a is a fluid tube connecting the first control fluid tube 86a to the pressure-receiving portion 85c of the switch valve 85B. The fourth fluid tube 87b is a fluid tube connecting the second control fluid tube 86b to the pressure-receiving portion 85c of the switch valve 85B.

In this manner, the switch valve 85A is opened under the state where the operation fluid flows in the direction indicated by the arrowed line A in the first supply-discharge fluid tube 83a. That is, the switch valve 85A is opened under the state where the operation fluid of the hydraulic device has returned to the first supply-drain fluid tube 83a, and thus operation fluid of the first control fluid tube 86a can be supplied toward the oil cooler 81 through the second fluid tube 84A.

In addition, the switch valve 85B is opened under the state where the operation fluid flows in the direction indicated by the arrowed line B in the second supply-discharge fluid tube 83b. That is, the switch valve 85B is opened under the state where the operation fluid of the hydraulic device has returned to the second supply-drain fluid tube 83b, and thus the operation fluid of the second control fluid tube 86b can be supplied toward the oil cooler 81 through the second fluid tube 84B.

Figure 4A:
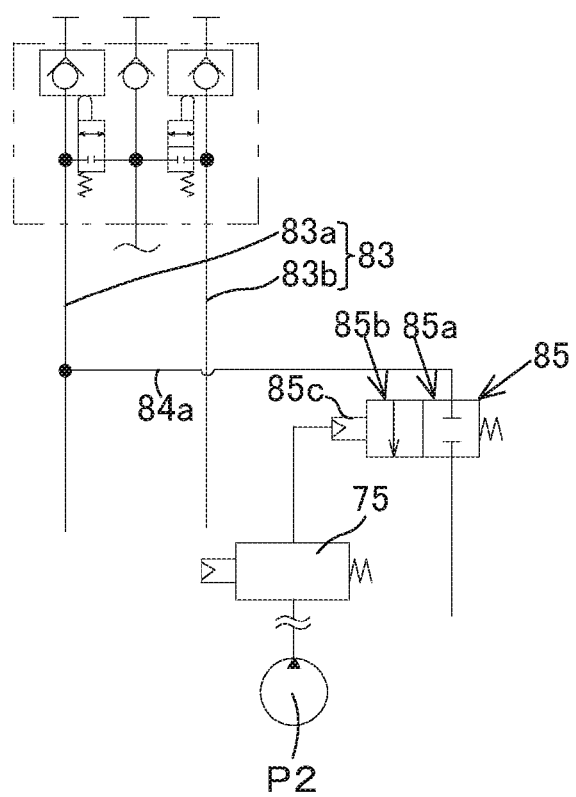
FIG. 4A is a view illustrating a first modified example of the second embodiment.

In the embodiment mentioned above, the switch valve 85 is switched with used of the pilot pressures applied to the first control fluid tube 86a and the second control fluid tube 86b. However, instead of that, the switch valve 85 may be switched by the pilot fluid outputted from the first hydraulic pump P1 as shown in FIG. 4A.

In that case, another valve (a switch valve or the like) 75 for switching the switch valve 85 may be disposed between the first hydraulic pump P1 and the pressure-receiving portion 85c of the switch valve 85, the other valve being configured to be opened and closed. In that case, the pilot pressure is applied to the pressure-receiving portion 85c of the switch valve 85 by opening the valve (a second operation valve) 75 for example, and thereby the switch valve 85 is switched to the second position 85b.

In addition, the pilot pressure is not applied to the pressure-receiving portion 85c of the switch valve 85 by closing the valve 75, and thereby the switch valve 85 is switched to the first position 85a. Meanwhile, the valve 75 illustrated in FIG. 4A may be a proportional valve instead of the switch valve mentioned above.

Figure 4B:
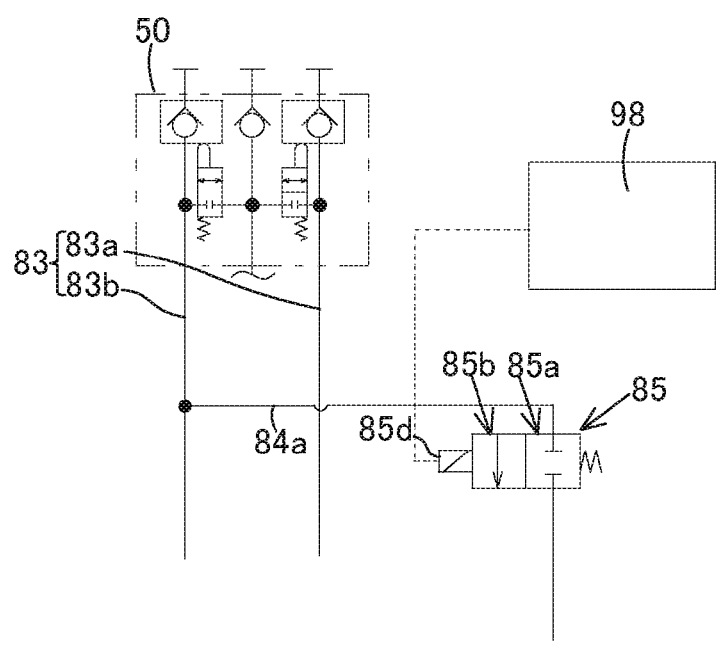
FIG. 4B is a view illustrating a second modified example of the second embodiment.

Moreover, as shown in FIG. 4B, the switch valve 85 may be a valve configured to be magnetized to change the aperture. In that configuration, the solenoid 85d of the switch valve 85 is connected to the controller 98. Then, the controller 98 outputs a control signal (for example, an electric current) from the controller 98 to the switch valve 85, and thereby the solenoid 85d is magnetized. In this manner, the switch valve 85 is switched to the second position 85b.

In addition, the output of the control signal from the controller 98 to the switch valve 85 is stopped, the solenoid is demagnetized, and thereby the switch valve 85 is switched to the first position 85*a*. The control signal from the controller 98 to the switch valve 85 may be outputted by a switch or the like connected to the controller 98 for example. When a cooling mode or a motor attachment mode is set by the operation of the switch, the control signal is outputted to the switch valve 85, and when the cooling mode or the motor attachment mode is released, the output of the control signal to the switch valve 85 is stopped.

The cooling mode is a mode for cooling the operation fluid in the oil cooler 81. The motor attachment mode is a mode to be set when the auxiliary attachment to be driven by the motor is attached.

The switch valve 85 may be switched in the case where the temperature of the operation fluid is high. For example, the first fluid tube 84 may be provided with a measurement device configured to detect the temperature of the operation fluid, and thus the controller 98 may be in the cooling mode when the temperature of the operation fluid measured by the measurement device is a predetermined valve (a threshold value) or more.

The cooling mode of the controller 98 is released when the temperature of the operation fluid measured by the measurement device is less than the threshold value. The controller 98 may open the switch valve 85 when the fluid returning from the auxiliary actuator increases and the operation fluid flowing to the auxiliary actuator increases.

That is, the switch valve 85 is opened when the stroke of the spool of the auxiliary control valve 56C exceeds a predetermined threshold value, when the spool of the auxiliary control valve 56C stops moving.

In the embodiment mentioned above, the oil cooler 81 cools the fluid returning from the travel motors (the first travel motor 31L and the second travel motor 31R) and the fluid returning from the hydraulic device. However, instead of that, the hydraulic system is configured as shown in FIG. 5, and thereby cool the fluid returning from the control valve 56 may be cooled.

Figure 5:
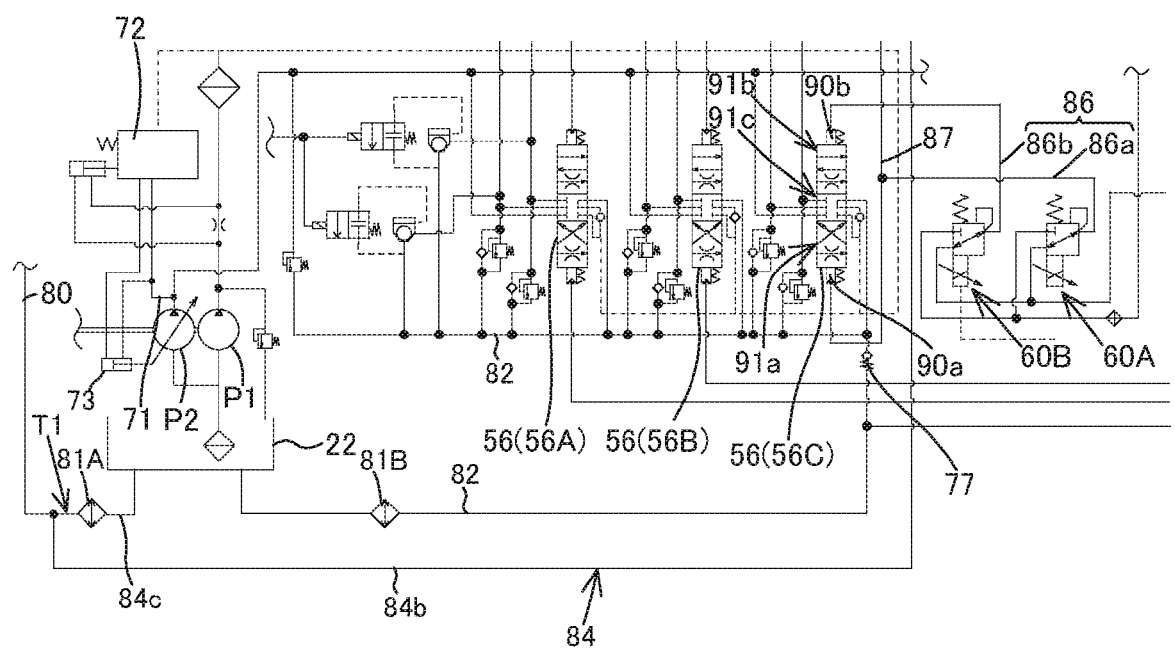
FIG. 5 is a view illustrating a third modified example of the second embodiment.

As shown in FIG. 5, a first oil cooler (a first fluid cooler) 81A is connected to an end portion of the second drain fluid tube 84*b* and to an end portion of the sixth fluid tube 80.

The third drain fluid tube 84*c* connects the first oil cooler 81A to the operation fluid tank 22. A second oil cooler (a second fluid cooler) 81B is connected to the fifth fluid tube 82 between the first check valve 77 and the operation fluid tank 22.

In this manner, the operation fluid returning from the control valves (the boom control valve 56A, the bucket control valve 56I, and the like) (a returning operation fluid) can be cooled by the second oil cooler 81B. The operation fluid returning from the travel motor and the hydraulic devices (a returning operation fluid) can be cooled by the first oil cooler 81A.

In particular, the returning operation fluids flow into the first oil cooler 81A when the travel motor and the like are operated. In addition, the returning operation fluids flow into the first oil cooler 81A when the auxiliary control valve 56*c* (the hydraulic device) are operated.

In FIG. 5, the second fluid tube 84 and the fifth fluid tube 82 are separately connected to the operation fluid tank 22. However, the hydraulic system includes the first check valve 77 configured to supply the operation fluid having a predetermined pressure or more in only one direction, and thus the operation fluid returning from the hydraulic device is easily supplied to the second fluid tube 84.

Third Embodiment

A modified example of the hydraulic system according to a third embodiment of the present invention will be explained below. Explanation of configurations similar to the configurations according to the first embodiment and the second embodiment will be omitted. The hydraulic system according to the third embodiment does not include the oil cooler 81 mentioned above.

Figure 6:
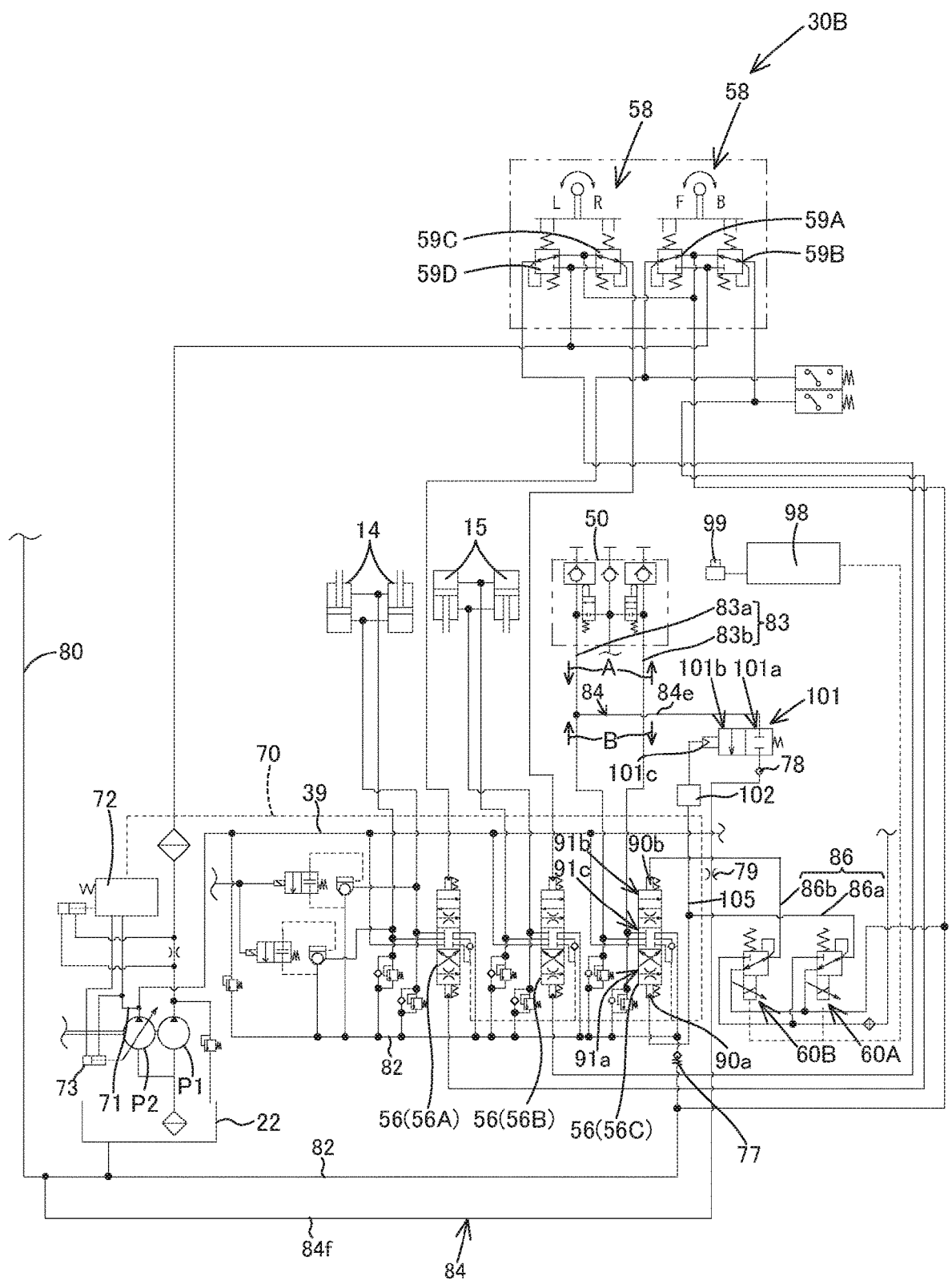
FIG. 6 is a view a schematic view illustrating a working hydraulic system according to a third embodiment of the present invention.

As shown in FIG. 6, the plurality of control valve 56 (the boom control valve 56A, the bucket control valve 56B, and the auxiliary control valve 56C) are disposed on a control valve (a control valve unit) 65.

A first operation valve 101 is disposed on an intermediate portion of the second fluid tube 84. In particular, the second fluid tube 84 includes a fifth drain fluid tube 84*e* and a sixth drain fluid tube 84*f*. The fifth drain fluid tube 84*e* connects the first supply-discharge fluid tube 83*a* to the first operation valve 101. The sixth drain fluid tube 84*f* connects the first operation valve 101 to the operation fluid tank 22. Meanwhile, a part of the sixth drain fluid tube 84*f* is shared with a part of the sixth fluid tube 80.

The first operation valve 101 is a valve configured to change the aperture of the first operation valve 101, and is constituted of a two-position switch valve configured to be switched to a first position 101*a* and to a second position 101*b*. When the first operation valve 101 is at the first position 101*a*, the aperture of the first operation valve 101 is substantially zero, and thereby a connection between the fifth drain fluid tube 84*e* and the sixth drain fluid tube 84*f* is closed. When the first operation valve 101 is at the second position 101*b*, the aperture of the first operation valve 101 is fully opened, and thereby the connection between the fifth drain fluid tube 84*e* and the sixth drain fluid tube 84*f* is opened.

The first operation valve 101 includes a pressure-receiving portion 101*c*. The pressure-receiving portion 101*c* is configured to receive the pressure of the operation fluid, and a seventh fluid tube 105 is connected to the pressure-receiving portion 101*c*. End portion of the seventh fluid tube 105 is connected to the first control fluid tube 86*a*, the end portion (the other end portion) being opposite to the end portion (one end portion) connected to the pressure-receiving portion 101*c*.

As described above, when one end of the seventh fluid tube 105 is connected to the pressure-receiving portion 101*c* and the other end of the seventh fluid tube 105 is connected to the first control fluid tube 86*a*, the seventh fluid tube 105 has the same configuration as the configuration of the fourth fluid tube 87.

A second operation valve 102 is disposed on an intermediate portion of the seventh fluid tube 105. The second operation valve 102 is a valve for switching the first operation valve 101, and is configured to change the aperture of the second operation valve 102. The second operation valve 102 is constituted of an electromagnetic valve or a manual valve, the manual valve being configured to manually change the aperture. In the case where the second operation valve 102 is constituted of the manual valve, the pilot pressure to be applied to the pressure-receiving portion 101*c* of the first operation valve 101 can be set by manually opening or closing the second operation valve 102 fully.

That is, the hydraulic system according to the third embodiment includes the second fluid tube 84, the first operation valve 101, the second operation valve 102, and the seventh fluid tube 105, and thus is capable of changing a flowing path of the operation fluid (the returning operation fluid) returning from the auxiliary hydraulic actuator.

For example, the auxiliary attachment is a breaker, the second operation valve 102 is fully opened. In this manner, the pilot pressure of the pilot fluid of the first control fluid tube 86a is applied to the pressure-receiving portion 101c, and thereby the first operation valve 101 is switched to the second position, 101b.

The operation fluid (the returning operation fluid) returns to the first supply-discharge fluid tube 83a from the hydraulic device configured to operate the breaker. The returning operation fluid passes through the second fluid tube 84 and the first operation valve 101, and then is supplied to the operation fluid tank 22.

Thus, in the case where the auxiliary attachment is the breaker or the like and the operation fluid returning from the breaker tends to be pulsated, the returning operation fluid can be supplied to the operation fluid tank 22 without passing through the control valve (the control valve unit) 65 having the auxiliary control valve 56C when the second operation valve 102 is fully opened.

In addition, when the second operation valve 102 is fully closed, the pilot pressure of the pilot fluid of the first control fluid tube 86a is not applied to the pressure-receiving portion 101c. In this manner, the first operation valve 101 is switched to the first position 101a. In the case where the first operation valve 101 is switched to the first position 101a, the returning operation fluid of the first supply-discharge fluid tube 83a passes through the auxiliary control valve 56C and then flows into the operation fluid tank 22.

The hydraulic system according to the third embodiment may include the oil cooler according to the first embodiment or the second embodiment. The opening and closing of the first operation valve 101 may be controlled by the controller 98 in the same manner according to the embodiments mentioned above.

In addition, the conditions to open and close the first operation valve 101 with the controller 98 may be the same as the conditions to the switch valve 85. That is, the control of the controller 98 according to the second embodiment may be applied to the first operation valve 101 instead of the switch valve 85.

Fourth Embodiment

A modified example of the hydraulic system according to a fourth embodiment of the present invention will be explained below. Explanation of configurations similar to the configurations according to the third embodiment will be omitted. The hydraulic system according to the fourth embodiment does not include the oil cooler 81 and the load sensing system mentioned above. The hydraulic system according to the fourth embodiment has a configuration capable of increasing the operation fluid.

Figure 7A:
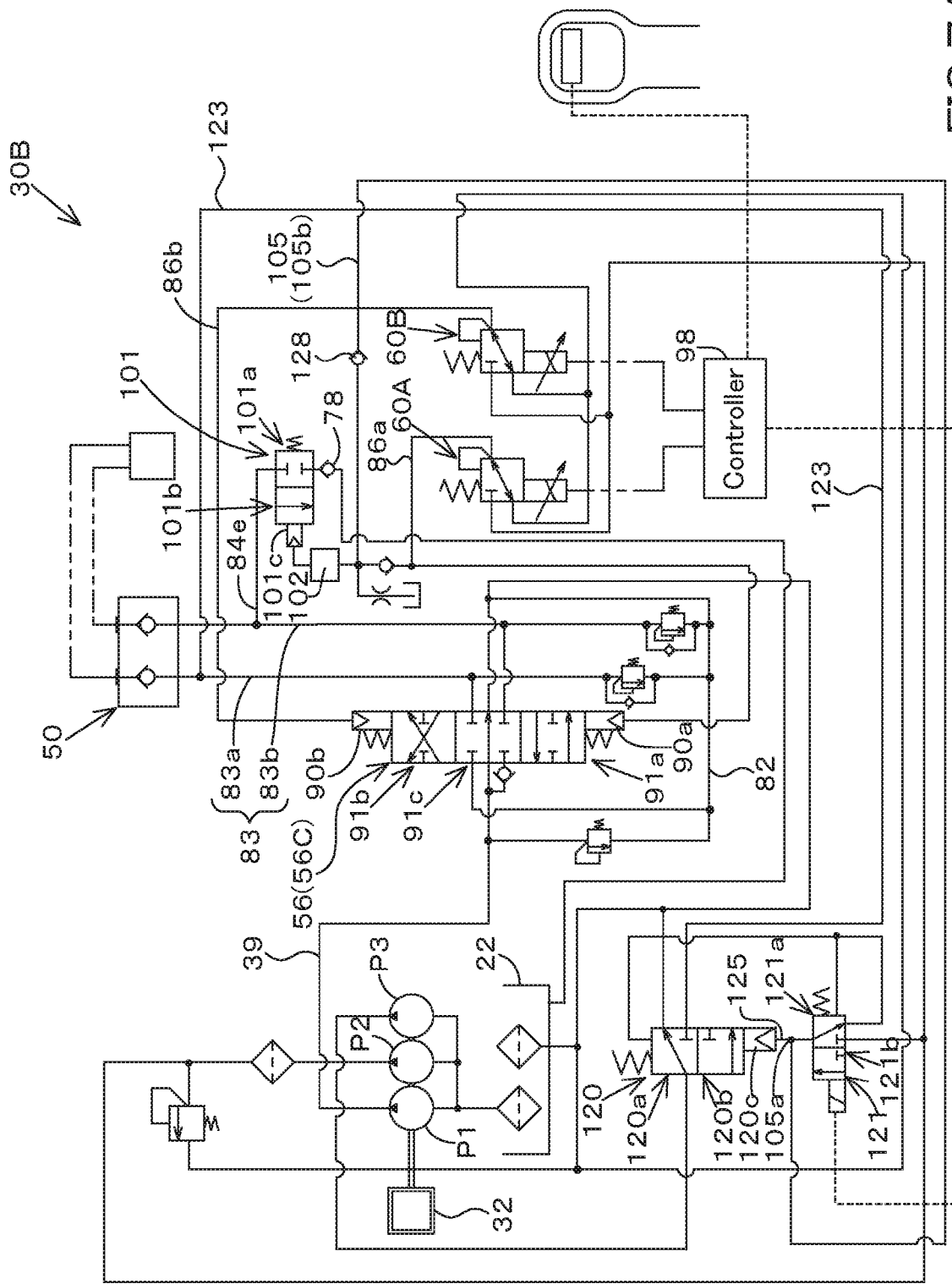
FIG. 7A is a schematic view illustrating a first working hydraulic system according to a fourth embodiment of the present invention.
Figure 7B:
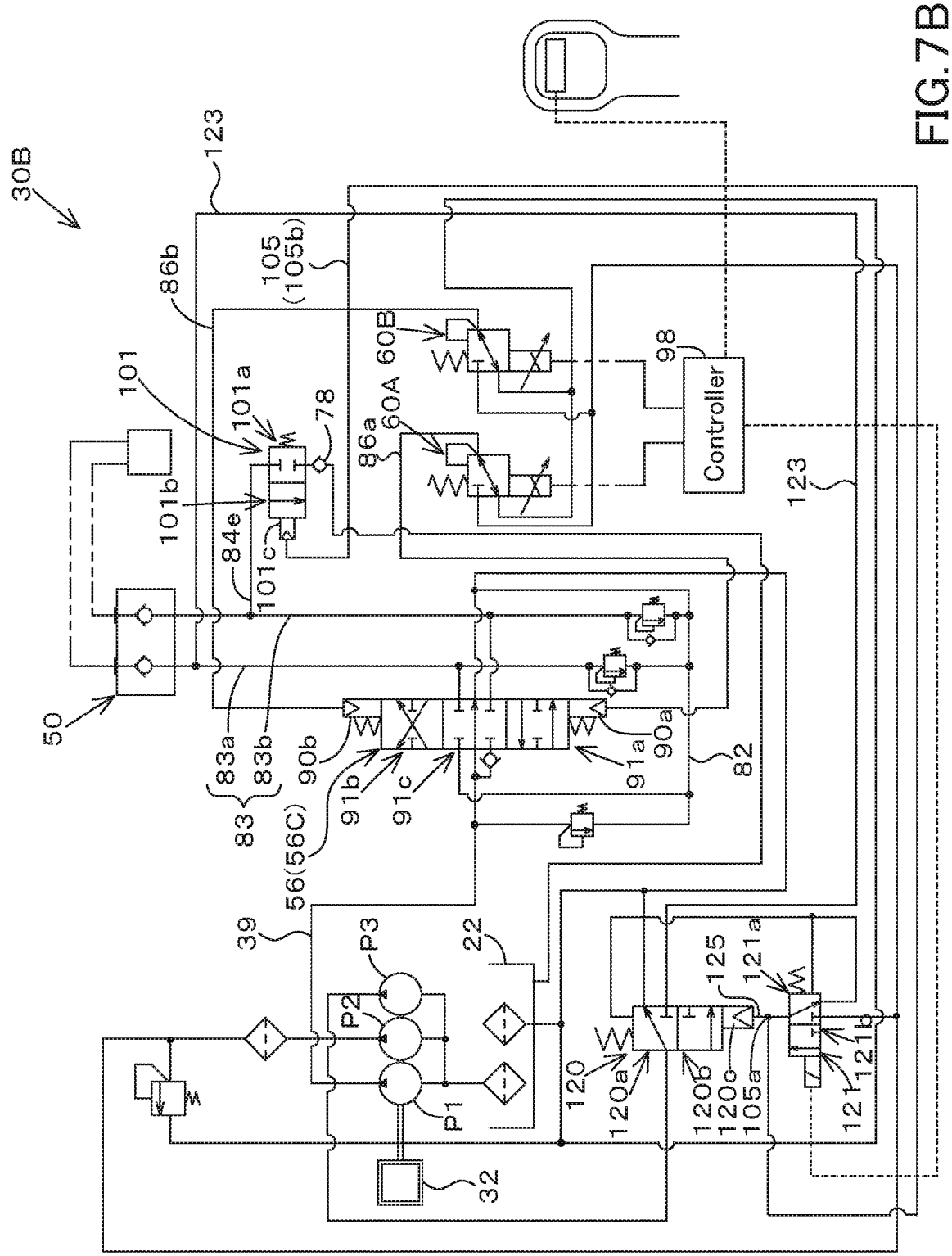
FIG. 7B is a view illustrating a second working hydraulic system according to the fourth embodiment.

As shown in FIG. 7A, the hydraulic system 30B includes a third hydraulic pump P3, the third operation valve 120, a fourth operation valve 121, and an eighth fluid tube 123.

The third hydraulic pump P3 is a pump configured to be driven by a motive power of the prime mover 32, and is a pump arranged on a position different from the first hydraulic pump P1 and the second hydraulic pump (the work hydraulic pump) P2. The second hydraulic pump and the third hydraulic pump P3 are pumps configured to be driven by the motive power of the prime mover 32, and are constituted of the constant displacement gear pumps.

That is, each of the first hydraulic pump P1, the second hydraulic pump P2, and the third hydraulic pump P3 is constituted of the constant displacement gear pump in the fourth embodiment. In particular, the third hydraulic pump P3 is a pump for additionally increasing the operation fluid, that is, a hydraulic pump for increment.

The eighth fluid tube 123 is a fluid tube branching from the first fluid tube 83 and being connected to the third hydraulic pump P3. In particular, one end of the eighth fluid tube 123 is connected to to first supply-discharge fluid tube 83a, and the other end of the eighth fluid tube 123 is connected to an output side of the third hydraulic pump P3.

The third operation valve (a high flow valve) 120 is a valve disposed on an intermediate portion of the eighth fluid tube 123, and configured to change the aperture of the third operational valve 120. The third operation valve 120 is constituted of a two-position switch valve configured to be operated by the pilot pressure. The third operation valve 120 is configured to be switched to two switching position (the first position 120a and the second position 120b) by the pilot pressure.

When the third operation valve 120 is at the first position 20a, the aperture of the third operation valve 120 is substantially zero, and thereby the flow rate of the operation fluid flowing in the eighth fluid tube 123 becomes zero. In addition, when the third operation valve 120 is at the second position 120b, the aperture of the third operation valve 120 is fully opened, and thereby the now rate of the operation fluid flowing in the eighth fluid tube 123 becomes a predetermined flow rate from zero.

In other words, the third operation valve 120 closes the eighth fluid tube 123 when the third operation valve 120 is at the first position 120a, and the third operation valve 120 opens the eighth fluid tube 123 when the third operation valve 120 is at the second position 120b.

Thus, when the third operation valve 120 is set to the second position 120b, the operation fluid outputted from the third hydraulic pump P3 can be supplied to the eighth fluid tube 123. The operation fluid flowing to the eighth fluid tube 123 is confluent with the operation fluid flowing to the first fluid tube 83. As the result, the operation fluid to be supplied to the auxiliary actuator can be additionally increased.

The third operation valve 120 is switched by the fourth operation valve (the switch valve) 121. The fourth operation valve 121 is constituted of an electromagnetic two-position switch valve. The fourth operation valve 121 is configured to be switched to the first position 121a and to the second position 121b. The fourth operation valve 121 is connected to the third operation valve 120 by a ninth fluid tube 125.

In particular, the third operation valve 120 includes a pressure-receiving portion 120c. The pressure-receiving portion 120c is configured to receive the pressure of the pilot fluid. The pressure-receiving portion 120c of the third operation valve 120 is connected to the fourth operation valve 121 by the ninth fluid tube 125.

When the fourth operation valve 121 is at the first position 121a, the pilot pressure is not applied to the pressure-receiving portion 120c of the third operation valve 120, and the third operation valve 120 is switched to the first position 120a. When the fourth operation valve 121 is at the second position 121b, the pilot pressure is applied to the pressure-receiving portion 120c of the third operation valve 120, and the third operation valve 120 is switched to the second position 120b.

The fourth operation valve 121 is switched to the first position 121a and to the second position 121b by the controller 98. When the switch is operated to the maximum extent, the controller 98 continuously magnetizes the solenoid of the fourth operation valve 121. In this manner, the fourth operation valve 121 is switched to the second position 121b.

When the switch is not operated to the maximum extent, the controller 98 demagnetizes the solenoid of the fourth operation valve 121. In this manner, the fourth operation valve 121 is switched to the first position 121a.

End portion of the seventh fluid tube 105 (a side connected to the pressure-receiving portion 101c) is connected to an intermediate portion of the ninth fluid tube 125, the end portion (the other end portion) being opposite to the end portion (one end portion) connected to the pressure-receiving portion 101c. In addition, the second operation valve 102 is connected to an intermediate portion of the seventh fluid tube 105.

Meanwhile, a section 105b between the second operation valve 102 and the connection portion 105a of the ninth fluid tube 125 is connected to the first control fluid tube 86a of the third fluid tube 86 in the seventh fluid tube 105. A check valve 128 is disposed on the section 105b of the seventh fluid tube 105, the check valve 128 being configured to allow the operation fluid to flow from the side of the ninth fluid tube 125 to the side of the second operation valve 102 and to block the operation fluid from flowing from the side of the second operation valve 102 to the side of the ninth fluid tube 125.

Fifth Embodiment

A modified example of the hydraulic system according to a fifth embodiment of the present invention will be explained below. The hydraulic system according to the fifth embodiment includes the oil cooler 81 and the load sensing system mentioned above. However, the load sensing system is not necessarily required in the hydraulic system according to the fifth embodiment. Explanation of configurations similar to the configurations according to the embodiments mentioned above will be omitted.

Figure 8A:
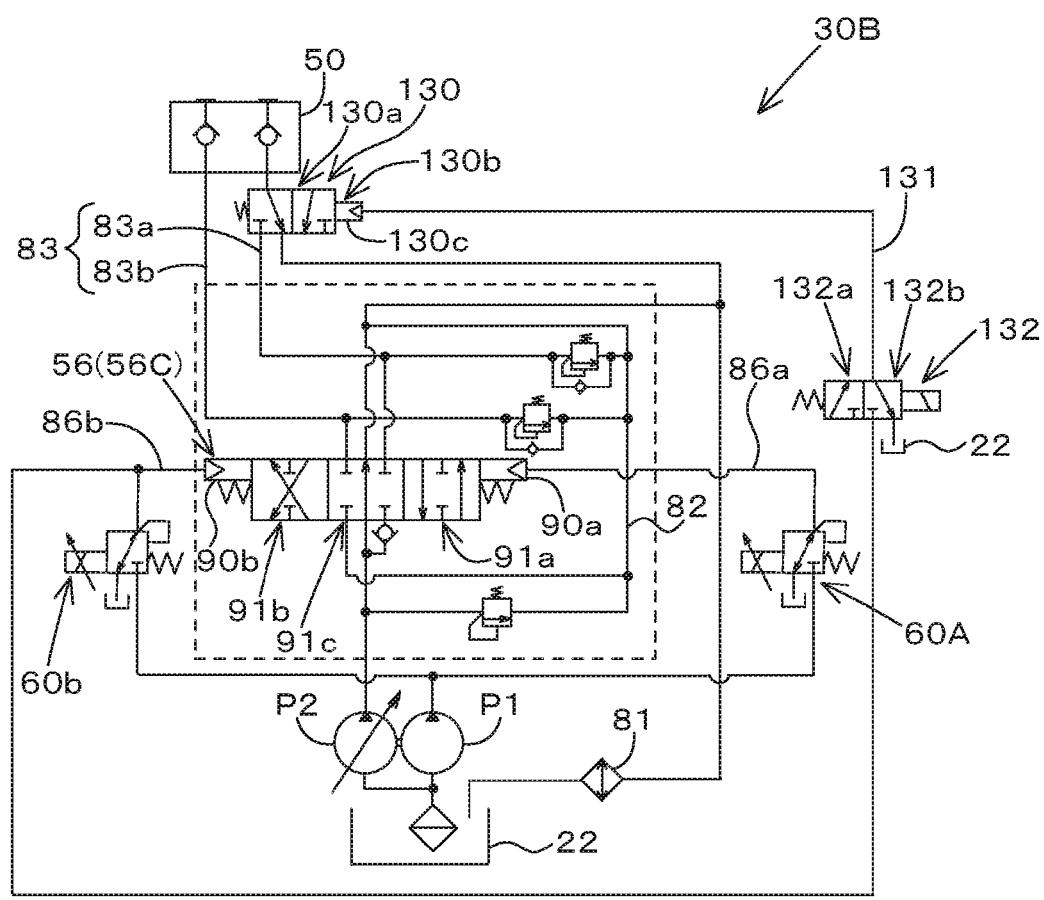
FIG. 8A is a schematic view illustrating a working hydraulic system according to a fifth embodiment of the present invention.

As shown in FIG. 8A, a fifth operation valve 130 is disposed on the first fluid tube 83. In particular, the fifth operation valve 130 is disposed on an intermediate portion of the second supply-discharge fluid tube 83b. In addition, the fifth operation valve 130 is provided with the fifth fluid tube 82. The fifth operation valve 130 is constituted of a two-position switch valve configured to be switched to a first position 130a and to a second position 130b.

When the fifth operation valve 130 is at the first position 130a, the second supply-discharge fluid tube 83b is communicated with the fifth fluid tube 82. When the fifth operation valve 130 is at the second position 130b, the second supply-discharge fluid tube 83b is opened (communicated).

The fifth operation valve 130 includes a pressure-receiving portion 130c. The pressure-receiving portion 130c is configured to receive the pressure of the pilot fluid, and is connected to a tenth fluid tube 131. End portion of the tenth fluid tube 131 (a side connected to the pressure-receiving portion 130c) is connected to the second control fluid tube 86b, the end portion (the other end portion) being opposite to the end portion (one end portion) connected to the pressure-receiving portion 130c.

A sixth operation valve 132 is disposed on an intermediate portion of the tenth fluid tube 131. The sixth operation valve 132 is a valve configured to switch the fifth operation valve 130. The sixth operation valve 132 may be constituted of an electromagnetic valve or a manual valve. In the embodiment, the sixth operation valve 132 is constituted of an electromagnetic two-position switch valve configured to be switched to a first position 132a and to the second position 132b.

When the sixth operation valve 132 is at the first position 132a, the operation fluid is allowed to flow from the side of the second supply-discharge fluid tube 83b to the pressure-receiving portion 130c of the fifth operation valve 130 in the tenth fluid tube 131. When the sixth operation valve 132 is at the second position 132b, the operation fluid is blocked from flowing to the operation fluid tank 22 in the tenth fluid tube 131.

Thus, when the sixth operation valve 132 is at the first position 132a, a predetermined pilot pressure is applied to the pressure-receiving portion 130c, and thus the fifth operation valve 130 is switched to the second position 130b. When the sixth operation valve 132 is at the second position 132b, a pilot pressure is not applied to the pressure-receiving portion 130c, and thus the fifth operation valve 130 is switched to the first position 130a.

Meanwhile, the sixth operation valve 132 is switched by the switch or the like connected to the controller 98.

Figure 8B:
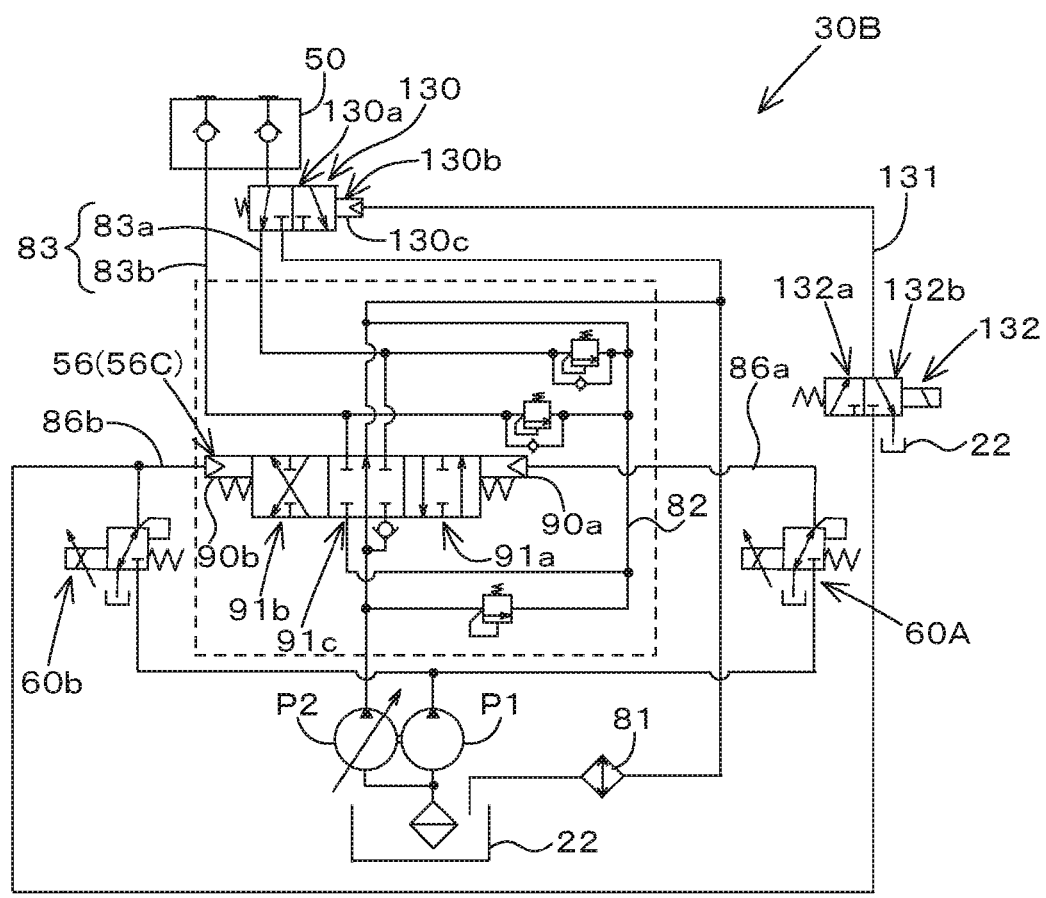
FIG. 8B is a view illustrating a modified example of the fifth embodiment.

FIG. 8B shows a modified example of the fifth operation valve 130 according to the fifth embodiment. The fifth operation valve 130 opens the second supply-discharge fluid tube 83b when the fifth operation valve 130 is at the first position 130a. In addition, the fifth operation valve 130 communicates the second supply-discharge fluid tube 83b with the fifth fluid tube 82 when the fifth operation valve 130 is at the second position 130b. In the hydraulic system shown in FIG. 8B, the configurations other than the fifth operation valve 130 is similar to the configurations shown in FIG. 8A.

Sixth Embodiment

A modified example of the hydraulic system according to a sixth embodiment of the present invention will be explained below. The hydraulic system according to the sixth embodiment includes the oil cooler 81 and the load sensing system mentioned above. However, the load sensing system is not necessarily required in the hydraulic system according to the fifth embodiment. Explanation of configurations similar to the configurations according to the embodiments mentioned above will be omitted.

Figure 9:
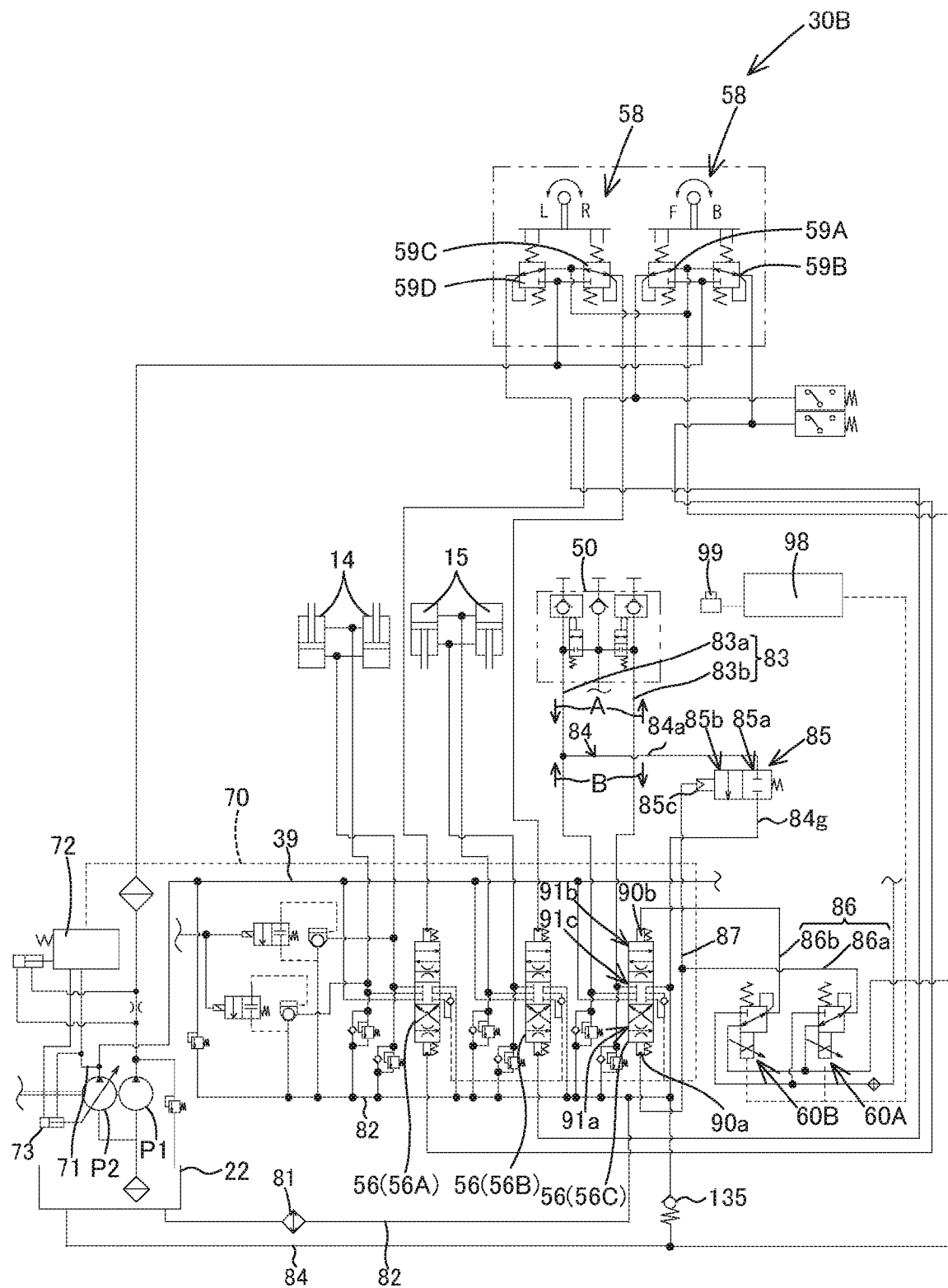
FIG. 9 is a schematic view illustrating a working hydraulic system according to a sixth embodiment of the present invention.

As shown in FIG. 9, the second fluid tube 84 includes the first drain fluid tube 84a and a seventh drain fluid tube 84g. The first drain fluid tube 84a connects the first supply-discharge fluid tube 83a. The seventh drain fluid tube 84r connects the switch valve 85 to the operation fluid tank 22. The fifth fluid tube 82 is connected to an intermediate portion of the seventh drain fluid tube 84g. A third cheek valve 135 is disposed on an intermediate portion of the seventh drain fluid tube 84g.

The third check valve 135 blocks the operation fluid having a predetermined pressure or more from flowing from a side of the operation fluid tank 22 to the second fluid tube 84 and allows the operation fluid to flow from a side of the second fluid tube 84 to the operation fluid tank 22.

The fifth fluid tube 82 is connected to the operation fluid tank 22 separately from the seventh drain fluid tube 84g. That is, the fifth fluid tube 82 branches at the intermediate portion and is connected to the seventh drain fluid tube 84g and the operation fluid tank 22. The oil cooler 81 is connected to the fifth fluid tube 82.

In this manner, the provision of the switch valve 85 does not require to return the operation fluid returning from the connection member 50 (the auxiliary actuator) to the operation fluid tank 22 through the auxiliary control valve 56C (the spool), and thereby reducing a pressure loss of the operation fluid.

In addition, the returning operation fluid can pass through the oil cooler 81 in both of the cases where the returning operation fluid is bypassed through the switch valve 85 and where the returning operation fluid is not bypassed through the switch valve 85, thereby cooling the operation fluid efficiently.

Meanwhile, the hydraulic system shown in FIG. 9 may have a configuration where the second operation valve 102 is disposed on the fourth fluid tube 87 and may have a configuration where the second operation valve 102 is not provided as shown in FIG. 9.

In the embodiment mentioned above, the flowing path of the operation fluid (the returning operation fluid) returning from the auxiliary hydraulic actuator is changed. However, the configuration may be applied to the circuits such as the travel device, the device, and the like. The travel device is explained as an example.

Figure 10:
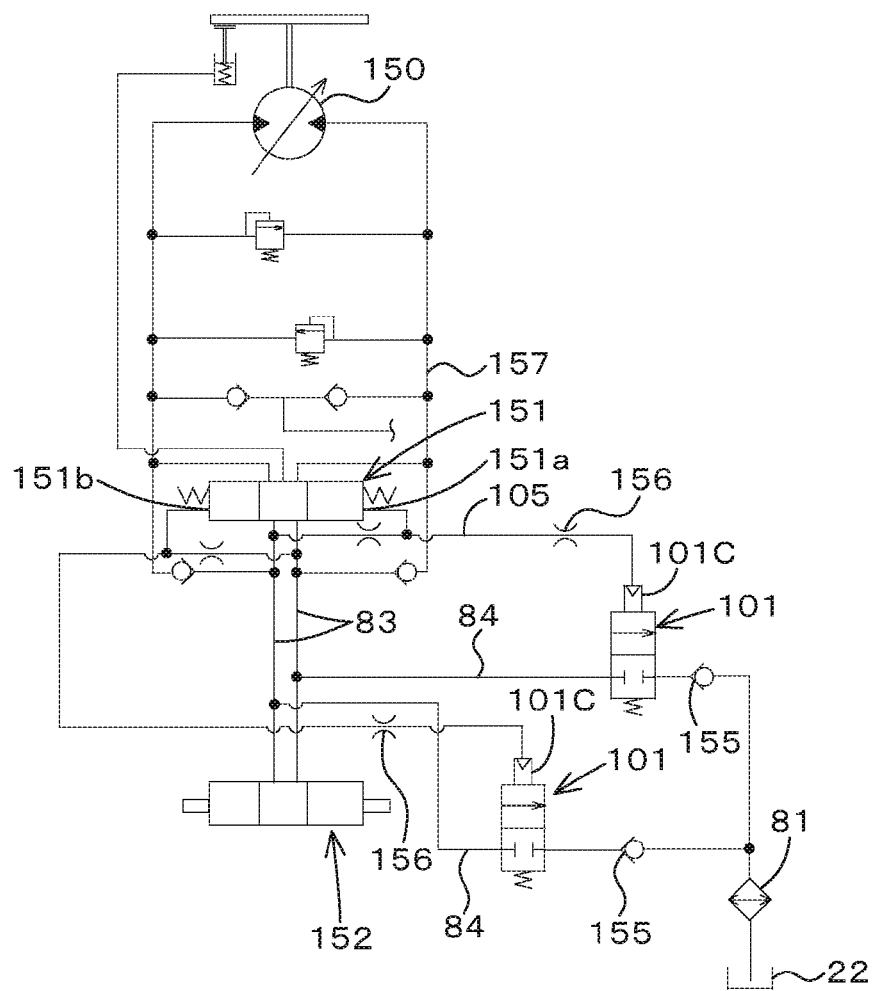
FIG. 10 is a view illustrating a modified example of the working hydraulic system according to the sixth embodiment.

FIG. 10 is a schematic view illustrating a hydraulic device of the turn device. The hydraulic circuit for the turn device is not limited to the circuit shown in FIG. 10. In addition, he hydraulic circuit of the turn device may be a closed circuit and may be an open circuit. The hydraulic circuit of the turn device can be applied to a work machine such as a backhoe and the like.

As shown in FIG. 10, the turn device is one of the hydraulic devices operated by the operation fluid, and includes a turn motor 150 and a switch valve 151. The switch valve 151 is configured to switch a turn direction of the turn motor 150 between a normal turn and a reverse turn. The turn motor 10 and the switch valve 151 are connected to a fluid tube 157. The switch valve 151 is connected to a turn control valve 152 by the first fluid tube 83. The turn control valve 152 control the turning.

The second fluid tube 84 is connected to the first fluid tube 83. The first operation valve 101 is connected to the second fluid tube 84. A check valve 155 is disposed on a downstream side of the second fluid tube 84. The seventh fluid tube 105 connects the pressure-receiving portion 101c of the first operation valve 101 to the pressure-receiving portions 151a and 151b of the switch valve 151. A throttle portion 156 is connected to the seventh fluid tube 105.

The hydraulic system according to the embodiment is configured to adequately cool the operation fluid even when the hydraulic device are operated by the operation fluid. In addition, the hydraulic system according to the embodiment is configured to change the path of the operation fluid (tile returning operation fluid) returning from the hydraulic actuator.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

The first check valve 77, the second check valve 78, the first throttle portion 79, and the like may be arranged in the control valve unit that has the plurality of control valves 56. And, the switch valve 101, the first cheek valve 77, the second check valve 78, the first throttle portion 79, and the like may be configured separately from the control valve unit.

In addition, a whole of or a part of the second fluid tube 84 may be included in the control valve unit. The first electromagnetic valve 60A and the second electromagnetic valve 60B may be arranged in the control valve unit. The first electromagnetic valve 60A and the second electromagnetic valve 60B may be configured separately from the control valve unit.

In addition, the second hydraulic pump P2 may be a constant displacement pump, and may be other types of pumps. The hydraulic system may include two constant displacement pumps to increase the operation fluid to be supplied to the hydraulic devices.

That is, the hydraulic systems according to the embodiments can be applied to the hydraulic system of a high flow specification that supplies the operation fluid by activating two constant displacement pumps or one of the constant displacement pumps depending on the auxiliary actuator.

In the embodiments mentioned above, the switch valve 85 is constituted of a two-position switch valve. However, instead of that, the switch valve 85 may be constituted of a pilot check valve that is configured to be operated by the pilot pressure. For example, a fluid tube is connected to a pressure-receiving portion of the pilot check valve, a pressure of the operation fluid (the pilot fluid) is applied to the pressure-receiving portion, band thereby the pilot check valve is opened. In addition, the pilot valve is closed by preventing the pressure of the operation fluid from being applied to the pressure-receiving portion of the pilot check valve.

In addition, regarding the above-mentioned valve having the spool, the spool may be moved by a hydraulic operation (a hydraulic operation by the pilot valve, a hydraulic operation by the proportional valve), by an electric operation (an electric operation by magnetizing the solenoid), or by other methods (other operations).

In the embodiments mentioned above, the operation fluid drained to the operation fluid tank. However, the operation fluid may be drained to other devices. That is, a fluid tube (a fluid path) for draining (discharging) the operation fluid may be connected to a device other than the operation fluid tank. For example, the fluid tube may be connected to a suction portion of the hydraulic pump (a portion to suck the operation fluid) and may be connected to other portions.

What is claimed is:

1. A hydraulic system for a work machine comprising:
   a tank to store an operation fluid;
   a hydraulic pump to output the operation fluid;
   a hydraulic device to be operated by the operation fluid;
   a control valve to control the hydraulic device, the control valve having an input port through which the operation fluid flows in, an output port through which the operation fluid flows out, a first supply-discharge port connected to the hydraulic device through a first supply-discharge fluid tube, and a second supply-discharge port connected to the hydraulic device through a second supply-discharge fluid tube;
   a second fluid tube branching from the first supply-discharge fluid tube to allow the operation fluid therein to be drained to the tank;
   a switch valve provided to the second fluid tube to control a flow rate and/or a pressure of the operation fluid;
   an oil cooler provided to the second fluid tube between the switch valve and the tank;
   a fifth fluid tube connecting the output port of the control valve and the tank; and
   a check valve provided in the fifth fluid tube to allow the operation fluid to be drained from the control valve to the tank through the fifth fluid tube only if the drained operation fluid has a pressure equal to or greater than a predetermined pressure.

2. The hydraulic system according to claim 1,
wherein the fifth fluid tube is connected to the second fluid tube for fluid communication of the operation fluid therebetween, and
wherein the check valve allows the fluid communication of the operation fluid from the fifth fluid tube to the second fluid tube and prevent the fluid communication of the operation fluid from the second fluid tube to the fifth fluid tube.

3. A hydraulic system for a work machine comprising:
a tank to store an operation fluid;
a hydraulic pump to output the operation fluid;
a hydraulic device to be operated by the operation fluid;
a control valve to control the hydraulic device, the control valve having an input port through which the operation fluid flows in, an output port through which the operation fluid flows out, a first supply-discharge port connected to the hydraulic device through a first supply-discharge fluid tube, and a second supply-discharge port connected to the hydraulic device through a second supply-discharge fluid tube;
a switch valve connected between the first supply-discharge fluid tube and a second fluid tube, the switch valve configured to be switched between
a first position to allow fluid communication of the operation fluid from the first supply-discharge fluid tube to the second fluid tube, and
a second position to prevent the fluid communication of the operation fluid from the first supply-discharge fluid tube to the second fluid tube; and
an oil cooler connected to the switch valve through the second fluid tube,
wherein the output port of the control valve is connected through a fifth fluid tube to the tank.

4. The hydraulic system according to claim 3, comprising:
an electromagnetic valve to control the control valve and the switch valve, and
wherein the electromagnetic valve is configured to switch the switch valve to the first position when the operation fluid flows from the hydraulic device to the control valve through the first supply-discharge fluid tube.

5. The hydraulic system according to claim 3,
wherein the control valve is configured to be switched between a neutral position to a third position or a fourth position, and
wherein when the control valve is switched to the third position,
the operation fluid is guided from the pump to the hydraulic device through the input port and the second supply-discharge fluid tube,
a portion of the operation fluid is discharged from the hydraulic device to the tank through the first supply-discharge port, the switch valve, the second fluid tube and the oil cooler, and
a remaining portion of the operation fluid flows from the hydraulic device to the tank through the first supply-discharge port, the output port and the fifth fluid tube.

* * * * *